(12) United States Patent
Bridson

(10) Patent No.: US 6,359,270 B1
(45) Date of Patent: Mar. 19, 2002

(54) COMMUNICATIONS MODULE MOUNTING FOR DOMESTIC APPLIANCE

(75) Inventor: Andrew Bridson, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/388,810

(22) Filed: Sep. 2, 1999

(30) Foreign Application Priority Data

Sep. 4, 1998 (GB) ............................................. 9819316

(51) Int. Cl.[7] .............................. H05B 6/64; G06F 1/16
(52) U.S. Cl. ...................... 219/679; 219/702; 219/714; 361/681; 361/683; 345/905; 345/156
(58) Field of Search ............................... 219/702, 679, 219/714, 736–737, 720, 393, 506, 445.1; 340/536, 825.71–825.76; 705/26–27, 42; 361/681, 683; 99/285, 342; 345/173, 156, 905

(56) References Cited

U.S. PATENT DOCUMENTS

| 5,233,502 | A | * | 8/1993 | Beatty et al. | ................ | 361/681 |
| 5,570,267 | A | * | 10/1996 | Ma | .............................. | 361/681 |
| 5,636,101 | A | * | 6/1997 | Bonsall et al. | ............... | 361/681 |
| 5,646,819 | A | * | 7/1997 | Hill, III | ........................ | 361/683 |
| 5,791,992 | A | | 8/1998 | Crump et al. | | |
| 5,864,120 | A | * | 1/1999 | Vroom et al. | ................ | 219/400 |
| 6,043,461 | A | * | 3/2000 | Holling et al. | ............ | 219/445.1 |

FOREIGN PATENT DOCUMENTS

| EP | 75026 | | 3/1983 | | |
| EP | 387657 | * | 9/1990 | ................. | 361/681 |
| EP | 817423 | | 1/1998 | | |
| EP | 869447 | | 10/1998 | | |
| JP | 57-58022 | * | 4/1982 | ................. | 219/714 |
| JP | 58-11328 | * | 1/1983 | ................. | 219/702 |
| JP | 60-223918 | * | 11/1985 | ................. | 219/720 |
| WO | 9750045 | | 12/1997 | | |
| WO | 9856188 | | 12/1998 | | |

OTHER PUBLICATIONS

M. Kuharich, "Internet Refrigerator", Web Page, 'Online!, May 8, 1998, XP 002135510, FoRK Archive, Retrieved from the Internet: <URL:http://xent.ics.uci.edu/FoRK–archive/may98/0121.html> retrived on Apr. 10, 2000!.

Patent Abstracts of Japan, Publication No. 10276478, Date of Publication of Application Oct. 13, 1998 (Toshiba).

Patent Abstracts of China, Patent No. CN1156673, Publication Date Aug. 13, 1998 (Bai Zhiyong).

Davis, Jim, "333–MHz Pentium II PC in Fridge", http://news.cnet.com/category/0–1003–200–328903.htm, Apr. 30, 1998.*

* cited by examiner

Primary Examiner—John A. Jeffery
(74) Attorney, Agent, or Firm—Gregory A. Welte

(57) ABSTRACT

A domestic appliance is described having the ability to connect to the Internet. An appliance, such as a microwave oven, is equipped with a touch-screen display on its door. The display connects to a communication system, such as a miniature personal computer having a modem and a web browser. The display is mounted on the door of the appliance through mounting hardware and an adaptor.

17 Claims, 12 Drawing Sheets

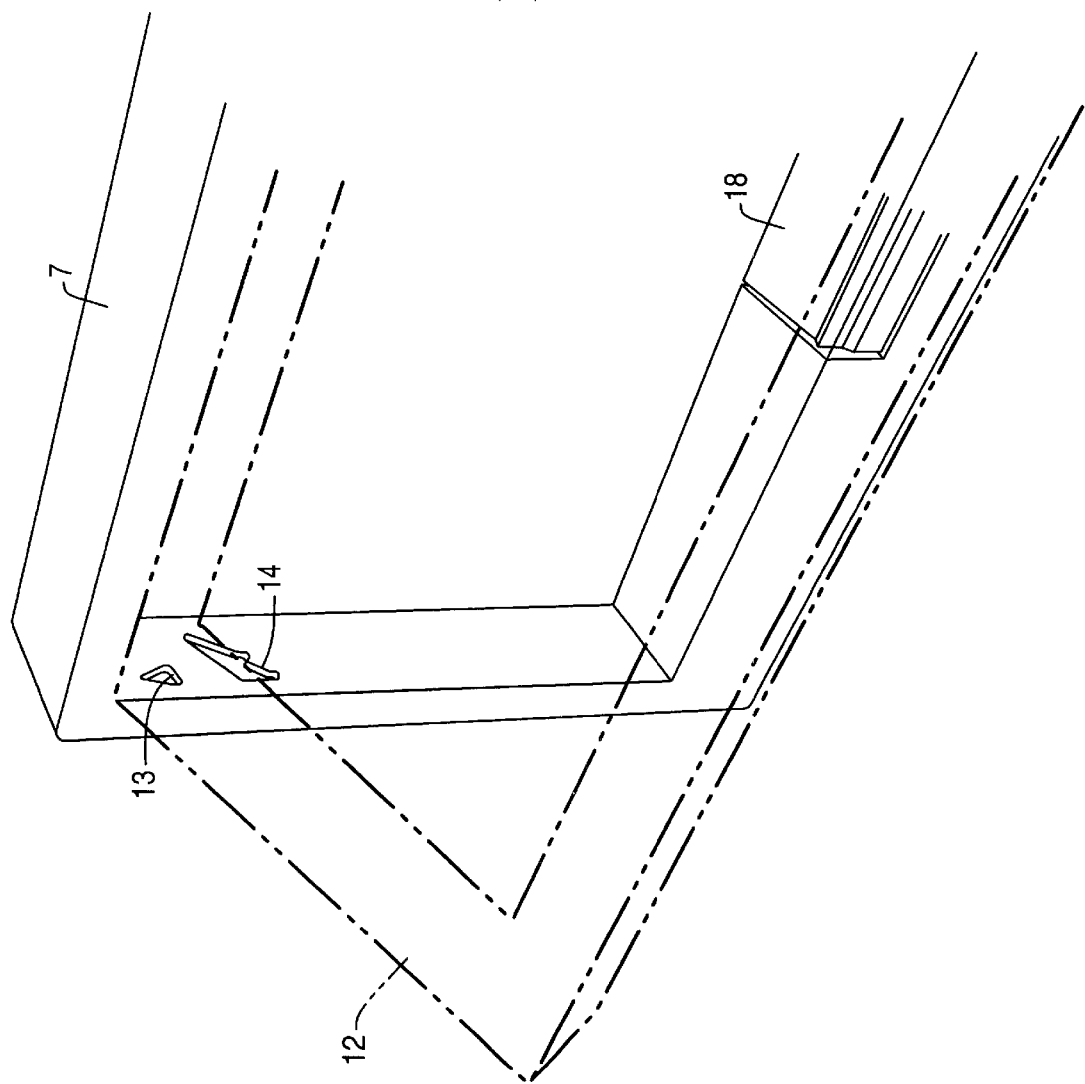

WEB AND TV CONTENT

TV ONLY CONTENT

COMMUNICATIONS MODULE MOUNTING FOR DOMESTIC APPLIANCE

BACKGROUND OF THE INVENTION

The present invention relates to communications, and contemplates easy-to-use computing devices deemed necessary to drive the next generation of computing. Particular aspects of the invention relate to communications in the domestic environment, involving a system arranged to manage data and to communicate data between the home and selected remote facilities.

Many everyday activities such as personal finance transactions and household shopping increasingly involve electronic data transfer between consumers at home and the related service provider. Telephone banking is already very popular and many banks now offer customers the option of on-line home banking over the Internet. Large supermarkets and department stores offer home delivery services, where a customer places an order for specific goods such as groceries by telephone or over the Internet and the ordered goods are subsequently delivered to the customer's home. Payment is generally effected by providing credit/debit or store card details when placing the order.

At present, the provision of on-line services over the Internet is largely available only to consumers having access to a personal computer (PC) linked to the Internet. However, many consumers do not have access to a PC within their domestic environment or are reluctant to use such services because of lack of familiarity with the use of computers. PCs are designed primarily as a functional tool for the workplace, and not for household use.

Even in households where consumers have access to a PC, the computer is rarely located in the most convenient domestic environment for use in performing routine domestic activities such as on-line shopping etc. Computers are often located in private spaces within the home, such as a home office or a bedroom, rather than in more public spaces. This environment of use influences who in the household has access to the computer; studies show that, on average, usage still remains male-dominated rather than a shared family activity.

In recent years, the diffusion of home computers has slowed throughout the western world. By way of illustration, on-line PC household penetration in the US has slowed down at around 40%, despite very healthy predictions for home on-line access and ever-falling PC prices. It appears that the PC 'one size fits all' approach to computing does not satisfy the requirements of most consumers, whose lifestyle needs may be better met by alternatives offering ease of use that PCs fail to provide. There is therefore a need to satisfy the home computing needs of the many consumers who do not personally perceive the need for a home PC, or who are dissuaded by its complexity, inconvenience and cost. Accordingly, easier to use computing devices are needed to drive the next generation of computing within the home and indeed elsewhere. Those who bring such devices into public use will find a massive currently-offline market to be tapped.

The Applicant's studies with discussion groups have led to many interesting findings. Whilst most participants in such studies have experience of using computers at work, the studies noted a general feeling of uneasiness towards technology. The PC is often seen as being too complicated for most of the computing tasks that users want to perform at home or at work. Even for routine household tasks, the PC is seen as being cumbersome, slow to boot and in the 'wrong' room within the home, a room that is not used frequently. Also, there appears to be a lack of trust in PCs and their reliability. Most participants felt that technology would let them down since, from their experience of PCs at work, computers often 'crashed' or simply did not work properly. This attitude was reflected in relation to home banking applications, some participants seeking face-to-face contact with bank representatives for reassurance as well as tangible proof that a transaction has actually taken place.

Against that background of research in so-called relationship technologies, the Applicant has devised the concept of an Internet- and TV-enabled domestic appliance, preferably in the form of a microwave oven. The concept arose from several factors. One is the development of new relationship technologies, relating to how the appliance communicates with consumers via the Internet. Another is the idea of being there—a permanent presence, always on. The concept also depends upon sensitivity to the context and usefulness of the appliance with respect to its normal use within the home, and understanding and predicting the consumer's needs and desires, to offer suitable facilities through the appliance. In sum, the concept is intended to capture a significant proportion of the many currently-offline consumers by providing a familiar appliance in a familiar location, that has attractive functionality such as free TV and a simple user interface.

The Applicant is already pursuing patent applications directed to broad concepts of its Internet- and TV-enabled domestic appliance. However, the Applicant's research in the field is ongoing: this research has identified several problems to which solutions have been developed. The present application results from that research and development effort.

One such problem is that the invention contemplates a technically-sophisticated (albeit easy to use) communications module whose manufacture will require facilities that may not be available to appliance manufacturers. Also, appliances come in myriad shapes and sizes. It would be a major barrier to propagation of the technology if appliance manufacturers had to invest in making communications modules or in totally redesigning their appliances to accept such modules. It would similarly be a barrier if the communications module had in all cases to be adapted to suit the appliance.

SUMMARY OF THE INVENTION

The specification hereinafter proposes a solution to this problem. In accordance with this aspect of the invention, a domestic appliance is provided with mounting hardware, a discrete communications module connectable to a communications network, and an adaptor including means for attachment to the mounting hardware on the appliance and means for mounting the communications module to the appliance via the adaptor.

For neatness and protection, the communications module is preferably received in a recess in the adaptor, the adaptor suitably framing the mounted communications module received in the recess.

To enable access to the communications module during adjustment or removal, bias means may be provided to urge the communications module out of the recess. In that case, latch means acting against the bias means may be provided to hold the communications module releasably in the recess.

Adjustment for viewing of a display on the communications module is catered for by movably mounting the communications module with respect to the adaptor. Conveniently, the adaptor and the communications module are connected by mounting hardware that permits the communications module to adopt any of a plurality of discrete positions with respect to the adaptor.

It is preferred that the appliance has a door and that the mounting hardware, the adaptor and the communications module are part of the door of the appliance. The appliance is most preferably a microwave oven.

In preferred embodiments, the communications module is connectable to the communications network via a flying lead connectable to the appliance, the flying lead preferably connecting to an external terminal on the appliance. The flying lead may include a port for data communication between the communications module and the appliance.

This aspect of the invention extends to a method of assembling a domestic appliance and a standard communications module, the method comprising providing one of a plurality of different domestic appliances having mounting hardware, fitting to the mounting hardware of that appliance an appropriate one of a plurality of different adaptors each having a standard mounting for a communications module and means cooperable with the mounting hardware, and mounting to that adaptor a standard communications module.

Another potential problem arises from the possibility of a remote-controllable common user interface to operate both the communications module and the appliance with which that module is associated. Whilst remote control of the interface is highly desirable for convenience, it would be potentially disastrous inadvertently to use a remote control to start a cooking cycle on a microwave oven, or to switch off a freezer.

Again, the specification hereinafter proposes a solution to this problem. The invention contemplates a domestic appliance having a primary domestic function but being adapted for the secondary function of interaction with a communications network, the appliance including a user interface operable by direct contact with the appliance and a remote control facility operable by a remote control handset, wherein activating or deactivating the primary function of the appliance is reserved for the user interface and the remote control facility is incapable of activating or deactivating the primary function.

It is envisaged that, in most cases, the primary function of the appliance will be cooking, defrosting or freezing. As aforementioned, the appliance is preferably a microwave oven in which case the primary function is cooking or defrosting.

A conveniently integrated user interface can be constructed if the primary function of the appliance is operable via the communications network. It is envisaged that the remote control facility is capable of controlling the secondary function and optionally also part of the primary function of the appliance.

Other aspects of the invention relate to the commercial choice between open and closed Internet access, and particularly its impact upon advertising revenues. Advertising revenues are an important enabling factor in propagating the technology, bearing in mind that the communications module is but one element of a communications system also involving a broadband online connection and a broadband portal, all of which will be costly to develop, use or run. Consumers are traditionally unwilling to pay extra for general Internet services, especially if they are already paying a subscription to secure access to the Internet.

As the names imply, open access gives the user access to all sites on the World Wide Web (subject to e.g. filtering for adult content) whereas closed access enables access to only selected sites, which may be specially adapted to users of the appliance.

Closed access has superficial advantages for the service provider. These advantages are a captive body of customers, T-tax revenues from all on-line transactions that those customers perform through the limited portals that are available to them, and increased advertising rates at those portals because the portals will have a high level of visits by each active user. Open access is less directly profitable in this respect because customers are free to migrate to other sites. Nevertheless, open access is more appealing to the customer and so it is thought that any short-term reduction in revenues per customer by opting for open access will be more than compensated by a longer-term increase in the overall number of customers. A virtuous cycle results, with increased customer numbers bringing in greater advertising and T-tax revenues which, reinvested, improve content and attract more customers.

The most important driver in any advertising revenue stream is 'reach', which is the number of active customers. The invention therefore contemplates the provision of open access but that customers are enticed to stay with the appropriate service provider and discouraged to leave. Aspects of the invention reside in these enticements and discouragements, and more generally in the design of the portal itself.

For example, the invention contemplates an Internet redirection system for enabling an Internet service provider or ISP to control open Internet access by redirecting the user to an alternative version of a web site addressed by a user, the alternative version being specific to the service provider, wherein the system comprises a redirection table for storing a list of web sites for which alternative versions specific to the service provider exist, look-up means for consulting the redirection table when a user addresses a desired web site, and redirection means for redirecting the user to the alternative version of the addressed web site when such an alternative exists in the redirection table.

In this way, the user's essential freedom is preserved but, where an ISP-specific version of the addressed web site exists, the user is directed to that version in a way that maintains advertising revenues. This benefits the economics of the venture and acts as an enabling factor in propagating the technology.

It is possible for the redirection table to be stored locally on the user's Internet-browsing apparatus, in which case the system preferably includes update means for updating the redirection table by periodic download from the Internet service provider. The update means may be responsive to activation of the browsing apparatus, so as to update the redirection table upon powering up the apparatus.

This aspect of the invention may also be expressed as an Internet redirection method for enabling an Internet service provider to control open Internet access by redirecting the user to an alternative version of a web site addressed by a user, the alternative version being specific to the service provider, wherein the method comprises maintaining a redirection table storing a list of web sites for which alternative versions specific to the service provider exist, consulting the redirection table when a user addresses a desired web site, and redirecting the user to the alternative version of the addressed web site when such an alternative exists in the redirection table.

Further to control open access to the benefit of the ISP without hampering the user, the invention provides an Internet access system comprising an Internet-browsing apparatus operable by a user and being connected to the Internet, wherein the browsing apparatus is configured to open, upon activation, a web page that is not selectable by the user.

For appeal to a broad range of users, the browsing apparatus preferably includes TV functionality. In that event, control of the TV functionality is conveniently effected via the web page. The browsing apparatus may also control a domestic appliance in the manner aforesaid and again, control of the appliance may be effected via the web page. The invention therefore extends to a method of controlling TV functionality in Internet-browsing apparatus connected to the Internet, comprising using the Internet-browsing apparatus to retrieve a web page and using that web page to control the TV functionality. Similarly, the invention encompasses a method of controlling a domestic appliance, comprising using an Internet-browsing apparatus to retrieve a web page and using that web page to control the appliance. The web page can be downloaded from the Internet or retrieved from local storage in the Internet-browsing apparatus.

Either of these methods can further comprise delivering advertising or information images to the web page used by the Internet-browsing apparatus in controlling the TV functionality or the appliance. In other words, the user can be exposed to advertising via the web page used for control, for example by targeted banner advertising to which the user can respond by 'clicking-through', or by a sponsored frame of adverts around a TV window embedded within the web page. Means can be provided for varying the advertising or information images in accordance with the time of day, the weather, or stored user characteristics including predetermined preferences and interests, demographic standing, and recent buying or browsing patterns.

To encourage users to stay by providing a portal service relevant to the user's preferences, an aspect of the invention relates to an Internet portal providing content and/or advertising sections under control of a content delivery engine and/or an advertising engine, wherein the portal is associated with a user profile database that stores perceived user preferences and provides outputs to the content delivery engine and/or the advertising engine to target content and/or advertising according to the perceived preferences.

For greater effectiveness, the user profile database is preferably adaptive, taking inputs representing user behavior to reflect the user's buying and browsing habits. For example, the user profile database can take input from an advertising engine that gathers and forwards data on the user's response to adverts at the portal. The user profile database can also take input from a commerce engine that gathers and forwards data on purchases made by the user via the portal.

Another challenge arises in administering the preferred always-on characteristics of the communications module while saving power or reflecting the user's mode of use. Ideally, no conscious interaction between the user and the module should be necessary to switch the module into or out of a dormant, power-saving or screensaver mode. Well-known timeout means can be used to switch the module into such a mode and, as the specification will describe, proximity sensor means such as a passive infra red sensor can be used to switch the module out of such a mode and back into an active mode.

This aspect of the invention therefore resides in a communications means adapted for interaction with a communications network, the communications means including display means and command entry means, wherein the display means is switchable between modes in accordance with input from a proximity sensor adapted to sense the presence of a user near the communications means. The invention extends to an appliance having such a communications means, and to related methods of switching between modes.

The display means suitably switches from a 'standby' mode to an 'on' mode when the presence of a user is detected by the proximity means. The display means can enter the 'standby' mode upon a user entering a standby command via the command entry means. Additionally or alternatively, a timeout means takes activity input from the proximity sensor and the command entry means and puts the display means into the 'standby' mode when a predetermined period of inactivity elapses.

When in the 'standby' mode, the display means can display images downloaded from the communications network. Such images may be advertisements or information, which for maximum effectiveness can be varied in accordance with the time of day, the weather, or user characteristics stored in the communications network. Such stored user characteristics may include predetermined preferences and interests, demographic standing, and recent buying or browsing patterns as, for example, detected by the above-mentioned commerce and advertising engines of a portal.

With the proliferation of smartcard technology, it is considered important that the appliance of the invention and/or the communications module includes a smartcard reader for reading and preferably writing to a smartcard. The invention therefore extends to a domestic appliance including communications means adapted for interaction with a communications network, the communications means including display means and command entry means, the appliance further including a smartcard reader.

The appliance may therefore be configured to download electronic cash from the communications network onto a smartcard in data communication with the smartcard reader, and similarly to upload electronic cash to the communications network from such a smartcard.

The smartcard preferably identifies the user to the communications network for security purposes, or to configure, limit or otherwise define the service offered from the communications network to the user. The service offered by the communications network can reflect the user's preferences stored on the smartcard; it is also possible for the service offered by the communications network to be limited in accordance with the user's age or level of subscription payment to the network service provider. A user-identifying smartcard can also be used to configure the communications means to suit the user's operational preferences, for example to emulate the set-up of a PC also owned by the user.

For convenient and correct operation, the smartcard reader is preferably adapted to retain the smartcard during a transaction and may further includes means for preventing removal of the smartcard before the transaction is complete. It is also preferred that the smartcard reader is adapted to retain the smartcard after a transaction is complete.

Where the appliance is a microwave oven having a door on the front of a cabinet, the smartcard reader is conveniently positioned on a fixed control and display surface on the front of the cabinet beside the door.

The smartcard functionality of the invention extends to related methods of operation.

Aspects of the invention also reside in advantageous constructional features of the appliance in general. For example, the invention can be expressed as a domestic appliance adapted for interaction with a communications network by the addition of a substantially self-contained discrete communications module connectable to the communications network, the communications module including display means and command entry means. This modular construction creates an easy-to-assemble appliance whose major components can be sourced separately from manufacturers specializing in the respective technologies.

Conveniently, the appliance has a primary function such as cooking or defrosting that is at least partially controllable by the communications module. It is also possible that control of the primary function can be effected via the communications network. Where the communications network is the Internet, control may be effected by command entry acting upon a web page displayed by the display means as aforesaid.

For maximum appeal and utility to users, the communications module is preferably adapted to receive and display television broadcasts from the communications network. The communications network may be a broadband cable or xDSL network and if the communications network is xDSL, the communications module preferably further includes an RF TV input.

Elegantly, the command entry means is preferably a touch screen integrated with the display. The command entry means can also include a microphone for voice command inputs.

For maximum display area, the display means preferably occupies substantially all of the visible surface of the communications module when the module is mounted, attached or incorporated into the appliance. The aforementioned touch screen helps to enable this preferred feature.

For ease of assembly and to minimize changes to the appliance, the communications module is advantageously connectable to the communications network via a flying lead connected to the appliance. The flying lead can connect to an external terminal on the appliance.

The invention extends to a method of adapting a domestic appliance for interaction with a communications network, the method comprising adding a substantially self-contained discrete communications module to the appliance, the module having display means and command input means, and connecting that module to the communications network. This method suitably comprises connecting the communications module to the appliance to enable control of the appliance via the module.

BRIEF DESCRIPTION OF THE DRAWINGS

In order that the various aspects of this invention can be more readily understood, reference will now be made, by way of example, to the accompanying drawings in which:

FIGS. 5(a), 5(b) and 5(c) are a sequence of partial perspective views of the complete door assembly, showing a third component—a communications module—in three alternative positions;

DETAILED DESCRIPTION

Figure 1:
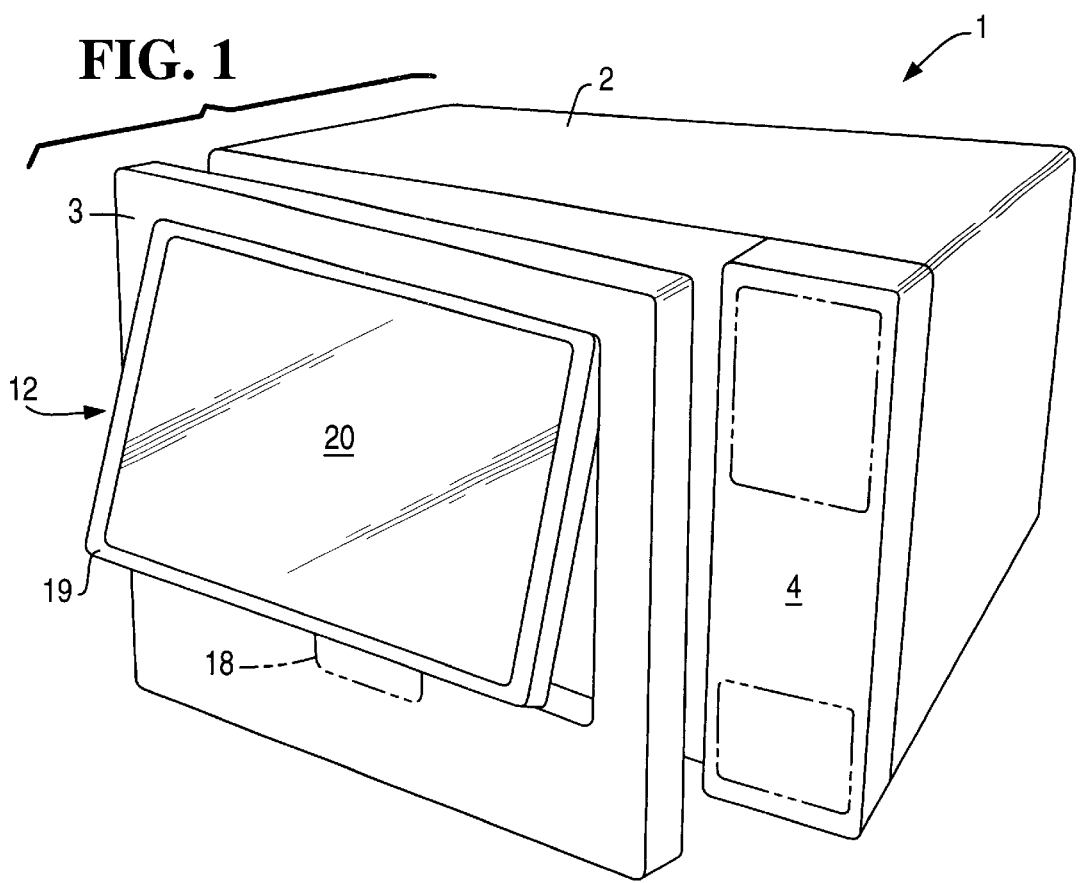
FIG. 1 is a perspective view of a microwave oven constructed in accordance with this invention, showing a partially disassembled door assembly.
Figure 3:
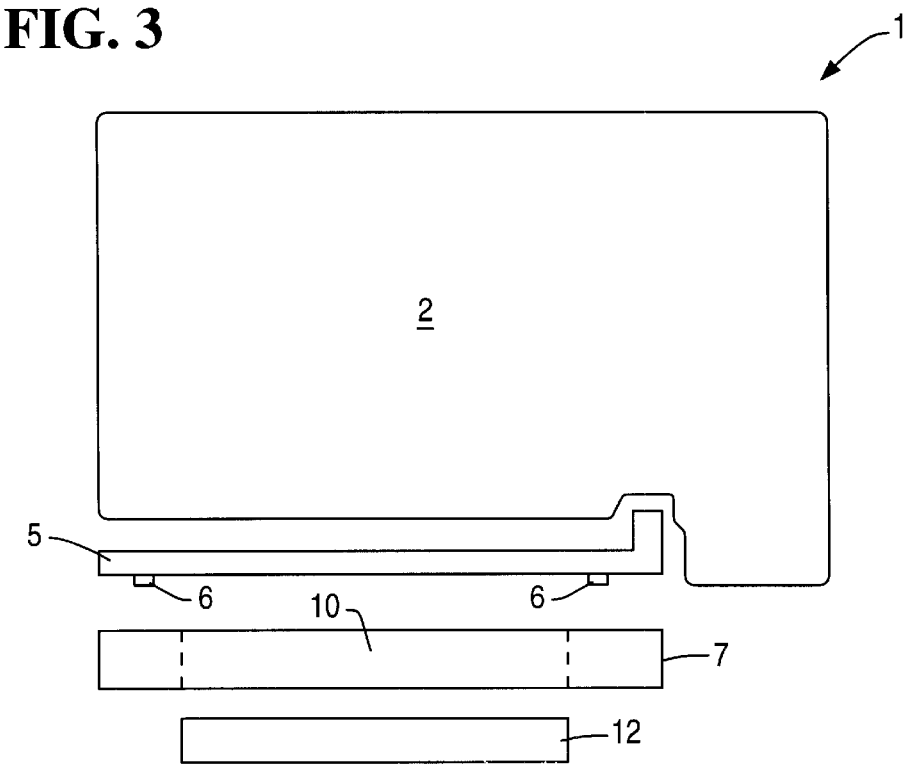
FIG. 3 is a plan view corresponding to FIG. 2 and showing how the three components of the assembly fit together to form the door of the microwave oven of FIG. 1.

Referring firstly to FIG. 1, a microwave oven 1 comprises a generally cuboidal hollow cabinet 2 whose open front is closed by a hinged door 3 offset to one side to provide space for a fixed control and display surface 4 beside the door 3. To a considerable extent, therefore, the oven 1 is of familiar appearance to those used to ordinary microwave ovens. However, in the embodiment illustrated, the door 3 is an assembly of three main components. That assembly 3 is best shown in FIGS. 2, 3 and 4, to which reference is now made.

The first component of the door assembly 3 is a door panel 5 hinged permanently to the body of the oven 1. The door panel 5 is a thin metal pressing that effectively replaces the door of a traditional microwave oven and so performs all necessary sealing functions to ensure operational safety. So, the microwave oven 1 can operate safely with only this door panel 5 in place. The door panel 5 carries latching hardware on its rear surface cooperable with corresponding latching means on the oven cabinet 2, although this hardware can be of standard design and so is not shown.

Unlike traditional microwave oven doors, which include a viewing window protected by a mesh that is substantially impenetrable to microwave radiation, the door panel 5 is opaque and carries an array of mounting lugs 6 on its exposed front surface. The mounting lugs 6 are positioned to correspond with and to be received by mounting holes 64 in the rear surface of the second component of the door assembly, namely a surround 7. The surround 7 snap-fits to the door panel 5 by co-operation between the mounting holes and the mounting lugs 6.

Figure 2:
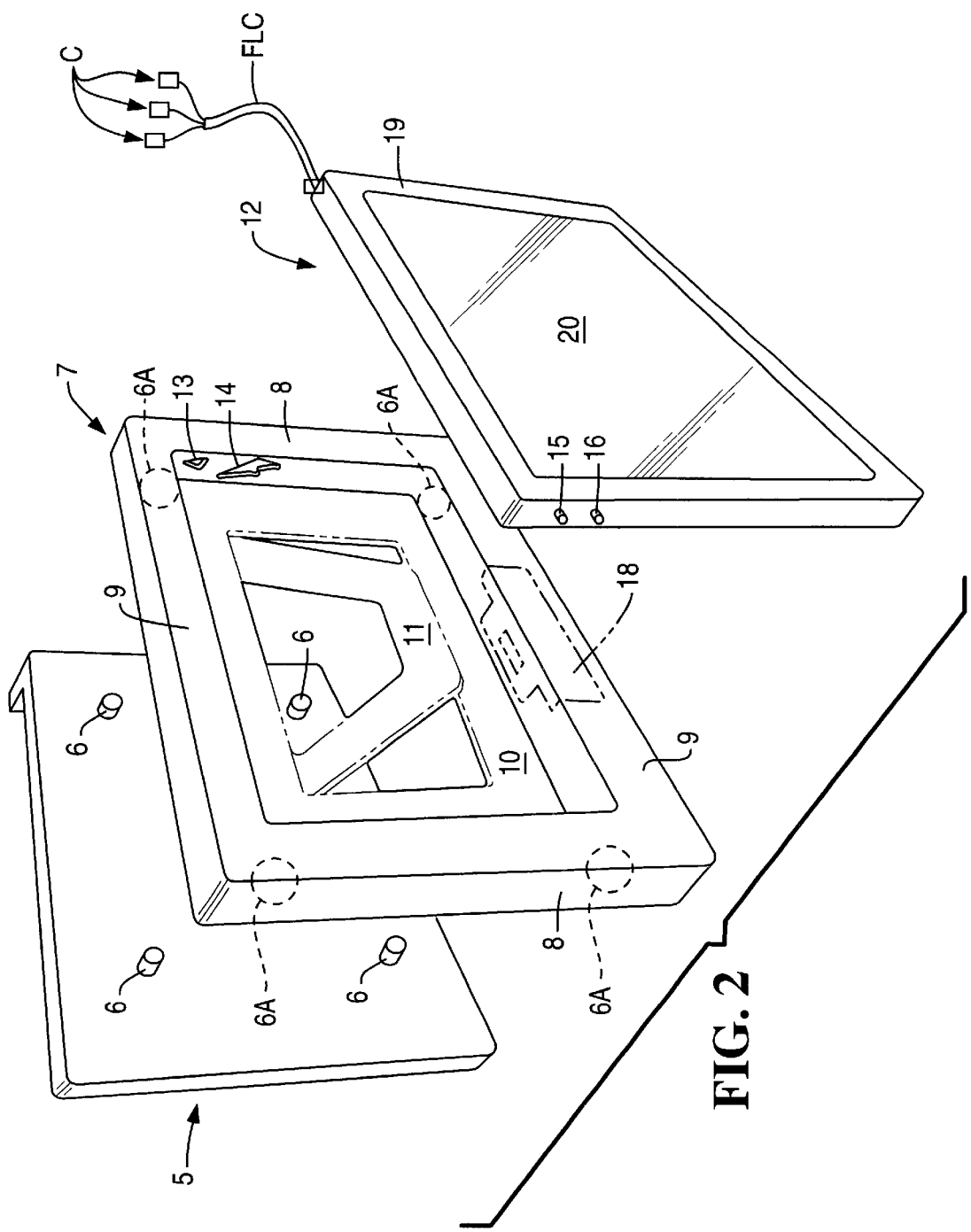
FIG. 2 is an exploded perspective view of the door assembly shown in FIG. 1, showing its three main components.
Figure 4:
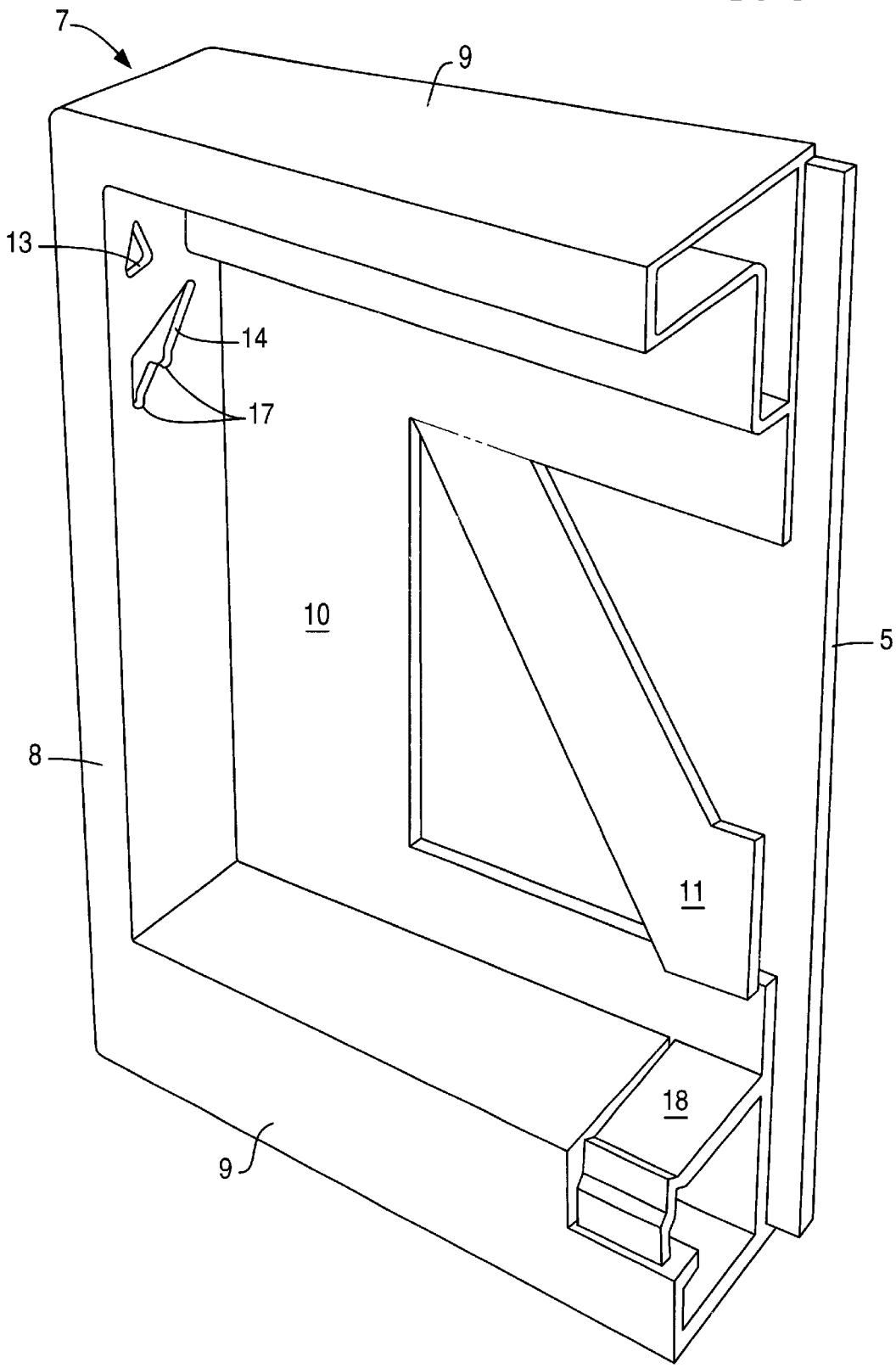
FIG. 4 is a sectional perspective view of an assembly of two of the components of the door construction, namely a door panel and a surround.

As best shown in FIGS. 2 and 4, the surround 7 is an oblong perimeter frame of hollow members—two uprights 8 connected by two cross-members 9—that between them define a shallow generally oblong recess 10. The front of the recess 10 is open and its back is defined by a web that is cut out to form a cantilevered spring member 11. The spring member 11 is inclined forwardly at its lower, free end to protrude into the recess 10.

The recess 10, in turn, receives a third component of the door assembly 3, namely a communications module 12.

Mating parts hold the communications module 12 in the recess 10, these parts comprising hinge openings 13 and locating openings 14 in the uprights 8 of the surround 7, which openings receive, respectively, hinge pins 15 protruding from near the top of each side of the communications module 12, and locating pins 16 protruding from the communications module 12 just below the hinge pins 15.

Figure 5A:
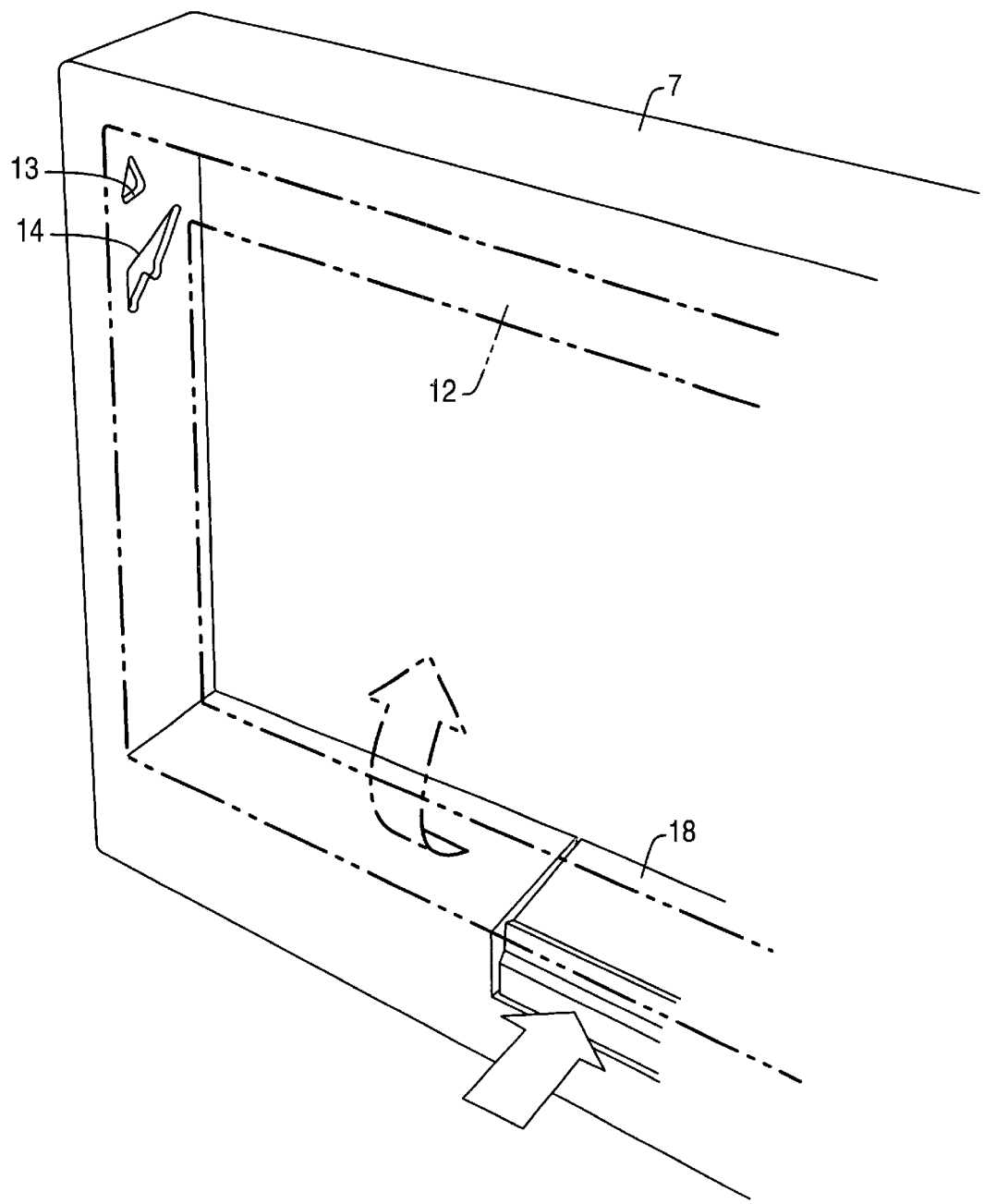
Figure 5B:
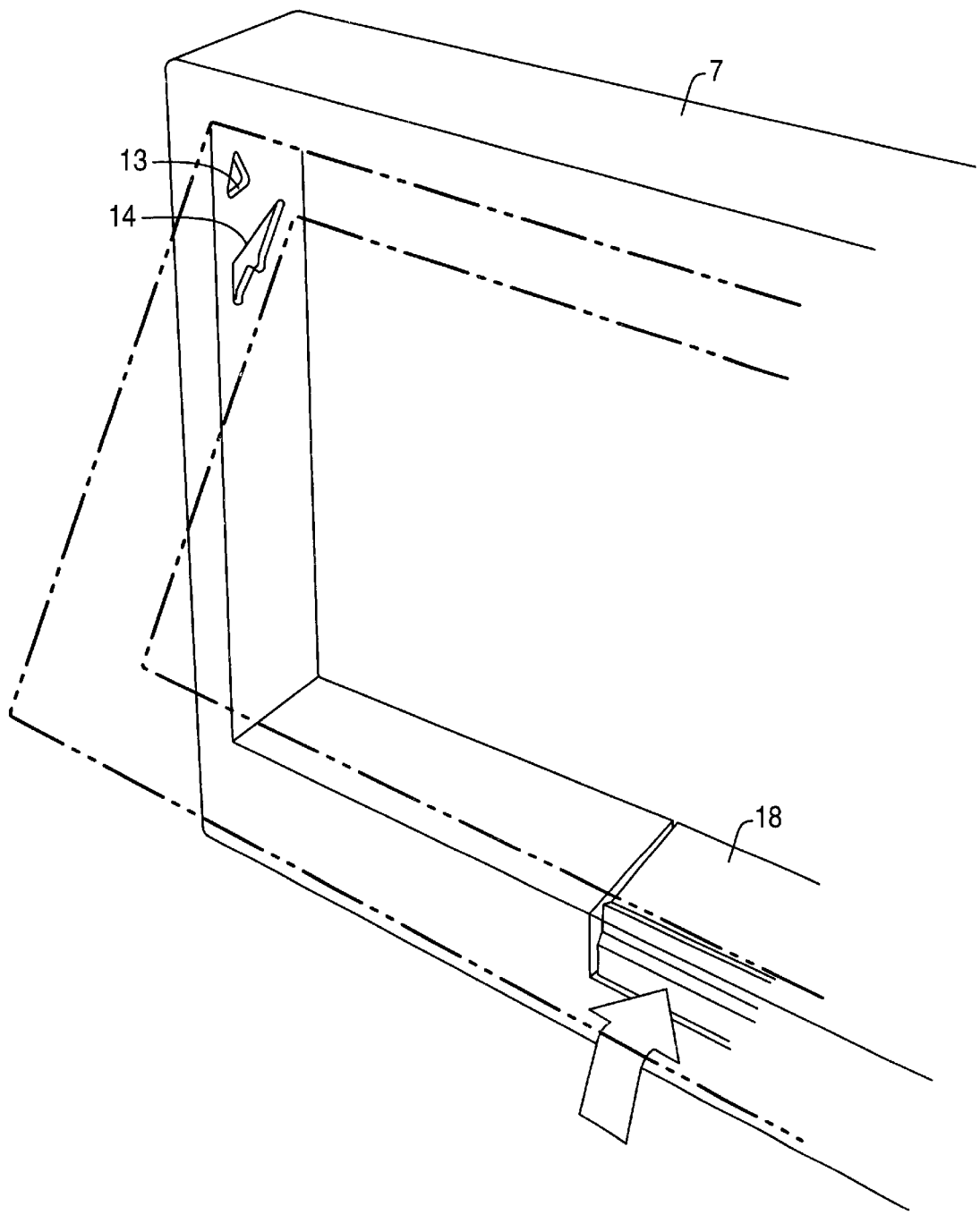

The thickness and shape of the communications module 12 matches the shallowness and shape of the recess 10, thus enabling the communications module 12 to lie flush with the front face of the surround 7 as shown in FIG. 5(*a*). Nevertheless, the communications module 12 can be tilted up by pulling its lower edge out of the recess 10, to either of two positions as shown in FIGS. 5(*b*) and 5(*c*). This improves visibility of the display carried by communications module 12 when the oven 1 is situated on a low surface. The communications module 12 hinges about the hinge pins 15 during this movement.

The locating openings 14 are shaped to define detents 17 for the locating pins 16 to hold the communications module 12 in the positions shown in FIGS. 5(*b*) and 5(*c*), the detents 17 being in the lower edge of each locating opening 14 so that the locating pins 16 are held therein by force of gravity acting on the communications module 12. The hinge openings 13 are large enough to permit the hinge pins 15 to float within the hinge openings 13 as the locating pins 16 move in and out of the detents 17 of the locating openings 14.

The spring member 11 of the surround 7 bears against the rear of the communications module 12 when the module 12 is mounted in the recess 10. The spring member 11 biases the communications module 12 forwardly out of the recess 10, which must therefore be pushed into the recess 10 against this bias when being mounted in the recess 10. The communications module 12 is retained against this bias by a sprung latch 18 in the lower cross-member 9 of the surround 7 that engages with a lug (not shown) in the lower edge of the communications module 12 when the communications module 12 is pressed fully into the recess 10. When the latch 18 is pressed, it disengages from the lug and allows the spring member 11 to push the lower edge of the communications module 12 out of the recess 10. The lower edge of the communications module 12 can then be grasped by a user and lifted into the desired angular position, whereupon the module is released to allow the locating pins 16 to fall into the appropriate detents 17 of the locating openings 14.

Stowing the communications module 12 back into the position shown in FIG. 5(*a*) is a reversal of this, involving lifting its bottom edge slightly to free it from the detents 17 and then pivoting the module 12 back towards the vertical against the bias force of the spring member 11. Once the lower edge of the module 12 is wholly within the recess 10, the lug at the lower edge of the module 12 engages with the latch 18 and the module 12 can be released.

As the door panel 5 and the surround 7 are separate components and as the door panel 5 is concealed by the surround 7 when the oven door is closed, there is scope for customization of otherwise identical microwave ovens by changing the shape, color, texture and/or size of the surround 7. Microwave oven manufacturers can produce standard door panels 5 or at least standard patterns of mounting lugs 6 on their door panels 5, to which different surrounds 7 can be attached to suit different sizes and shapes of cabinet 2. Nevertheless, each different surround 7 defines a standard recess 10 adapted to receive a standard communications module 12. So, by using the surround 7 as an intermediary or adaptor in this way, a standard communications module 12 can be fitted neatly to any of several completely different microwave ovens without calling for major tooling investments from their manufacturers. The same principle can of course be applied to any appliance.

Accordingly, by means of the invention, the communications module 12 could be manufactured by numerous companies that do not necessarily have appliance manufacturing expertise. Conversely, appliance manufacturers that do not necessarily have a high-technology capability could use the module simply by providing appropriate mounting hardware.

An important aspect of this facility is compactness, the idea being that everything required to conform to the architecture described below is contained in the communications module 12 contained in turn within the microwave oven door. For typical European microwave models, the door is about 28 cm high, about 40 cm wide, and about 4 cm thick. The entire door assembly described above must therefore fit within this volume, confining the communications module 12 itself to somewhat less than this volume. The electronics and especially the display within the communications module 12 must be shielded from potential sources of heat, especially in combination microwave/convection ovens or in dual-function microwave ovens that have IR heating elements to brown the food being cooked.

The communications module 12 is a self-contained unit that can be integrated into the door 3 of the microwave oven or indeed similarly integrated or otherwise attached to other appliances around the home or workplace. For this purpose, the communications module 12 has flying leads (not shown) for power and communications that can be routed through e.g. the door hinge of a microwave oven to a convenient position within the oven, terminating with a suitable external I/O panel. Indeed, with suitable power supplies and communications connections, the communications module 12 can be used on its own, independently of a supporting appliance, to serve various other functions.

For example, a stand-alone communications module 12 could perform as a communications and entertainment module for use in hotels. Suitably programmed and connected, one such module 12 could replace the TV, the movie set top box and the telephone within a hotel room. Additionally, this module 12 could allow a user to read his or her e-mail in the hotel room by configuring the module 12 to emulate their own PC, for example using a smartcard securely to store and download configuration information to the module. These are just a few possibilities: there are myriad uses to which such a compact and configurable module 12 could be put.

With the exception of a thin peripheral frame 19 that wraps around the edges of the communications module 12, substantially the entire front of the communications module 12 is defined by an LCD display 20 having a touch screen overlay that is not visible in the drawings. The LCD display 20 is a widely-available and economical 12.1"-diagonal TFY-type flat panel including a backlight facility, although it may be possible to use a lower-cost alternative such as a reflective-type LCD that does not require backlight control. Of course, the size of the LCD display 20 will ultimately be dictated by the size of the microwave oven door. Display resolution of 800×600 is deemed adequate for present purposes, operating on an SVGA input signal. The module 12 can be factory pre-set for optimum operation in SVGA mode, although VGA compatibility is also possible. There is considered to be no need for manual adjustment of brightness or contrast.

The touch screen overlay is a five-wire resistive touch screen operating under the control of appropriate control electronics and a Windows CE driver, suitably having a resolution of 4096×4096 and achieving positional accuracy of ±1%.

It is preferable, but not essential, that the communications module 12 has some means of indicating that power is on, for example a 'power-on' LED. This objective may, however, be achieved by running a screen saver on the display 20.

So far as the user is concerned, all operation of the communications module 12 will be via the touch screen, or by an IR remote control (not shown). The microwave oven 1 itself can be controlled via the communications module 12 but, for safety purposes, it is envisaged that the remote control will have no ability to switch the microwave oven 1 into a cooking mode: this is reserved for the touch screen. In this way, it is ensured that the user is always present at the start of cooking and that, for example, someone putting something heavy onto the remote control cannot inadvertently start the oven 1 cooking. Similarly to prevent inadvertent operation, any set-up controls required are positioned internally within the communications module 12 so that they are accessible to production and service personnel but are not available to the user.

The communications module 12 relies upon the quality of its user interface to appeal to those with low computer literacy skills and little or no online experience, but who are familiar with using a microwave oven, who typically use paper diaries & noticeboards, and who are aware, at least in outline, of the use of touch screen devices.

Users should be able effectively and efficiently to perform a task (banking, shopping, e-mail, cooking etc.) using the touch screen and/or the remote control, while their use of the oven 1 for cooking and defrosting purposes should not be impeded to any significant extent. Crucially, users must perceive the module 12 as being less difficult to use than a standard PC providing similar functions. To this end, simple user instruction and onscreen help facilities support user interaction.

The user interface provides a common interface by which a user of the system can select, access and interact with the communications module 12 and the general cooking function of the oven 1 with which it is associated. Advantageously, the display screen 20 with its touch screen overlay is arranged as a graphical user interface and is provided with an icon-based tool bar. This allows for ease of access and choice of the appropriate functionality afforded by Internet tools such as standard web browsers, and achieves quick and ready access to functions commonly arising in relation to electronic mail, electronic banking, electronic shopping and personal organizer facilities of the system. Hence, the display 20 provides a user interface not only for the general cooking functions of the oven 1 but also for the control and management of data and the Internet access achieved by means of the communications module 12.

A childproof latch or an optional parental lock-out code may be employed to alleviate concerns as to safety and restricted content.

The LCD display 20 is sandwiched between the touch screen overlay and a core processing module 21 (not shown in FIGS. 1 to 5, but see FIG. 6 for its hardware architecture) situated behind the display 20 within the communications module 12. The core processing module 21 can therefore be connected directly to the display 20 and the touch screen overlay, to the benefit of cost and reliability; for further cost-effectiveness, the core processing module 21 is suitably embodied within a single PCB.

A single DC power supply module (not shown) is provided within the communications module 12, and is preferably capable of accepting a universal voltage input (100–250 V 50/60 Hz AC) to cater for the main supply systems of different countries. A voltage selector may be provided to tailor the module 12 to the country of sale. However, if such a selector is provided, it is preferably inaccessible to the consumer so that the core processing module 21 cannot easily be damaged by being set to the wrong voltage.

The preferred style of power connector is a permanently attached mains cord, or alternatively an approved 3-pin bulkhead attached mains connector.

Figure 6:
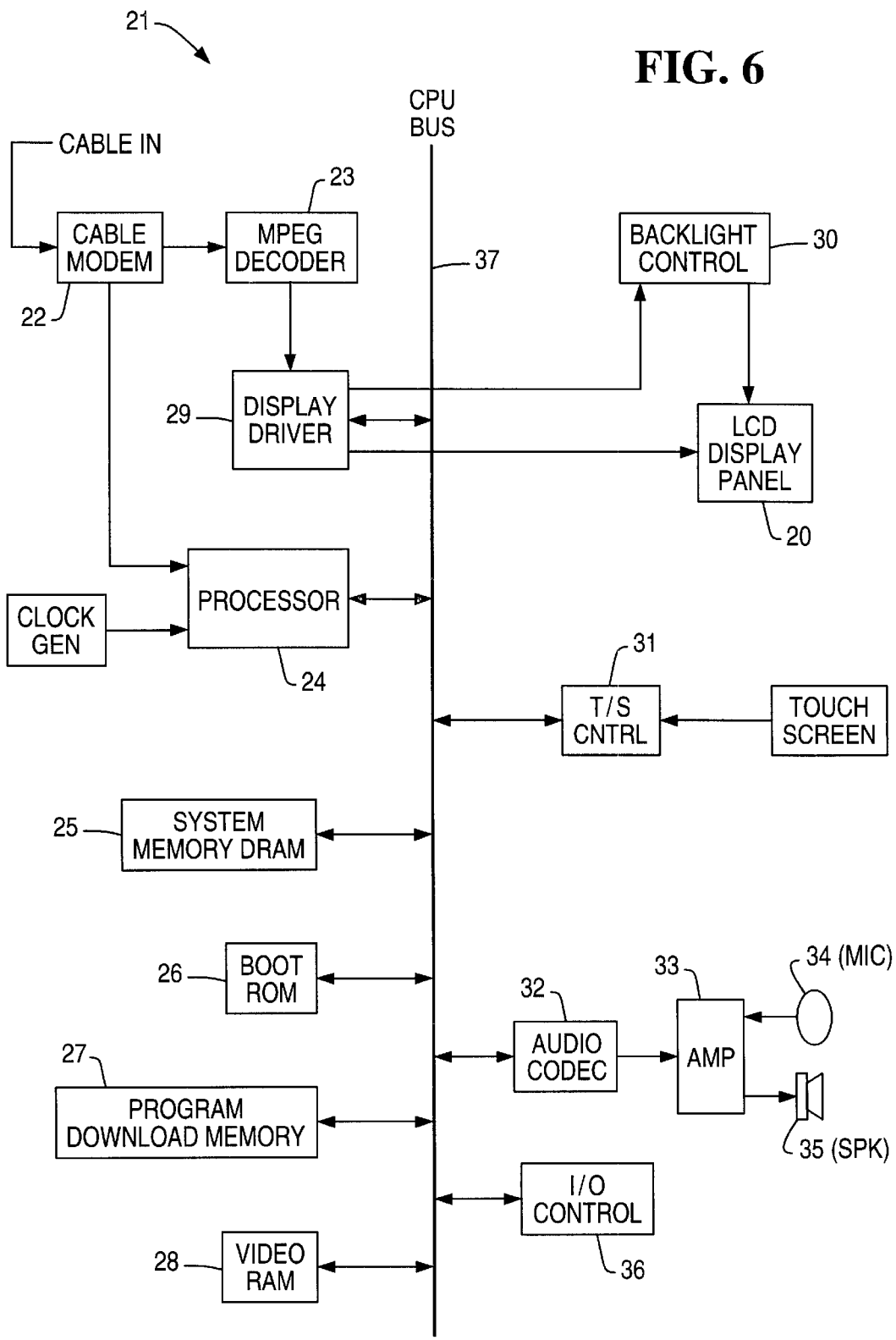
FIG. 6 is a block diagram showing the hardware architecture of a core processing module within the communications module of the invention.

The hardware architecture of the core processing module 21 is set out in FIG. 6. This architecture relates to a cable-connected unit because the preferred, default communications sub-system is cable. Cable provides downstream video and data and an upstream data channel, one connection thus being all that is necessary to transmit TV and allow Internet access. The cable modem 22 and MPEG decoder 23 shown in FIG. 6 are specific to that application.

There are currently two main standards for data over cable connections:

Digital Video Broadcast and Digital Audio Video Council (DVB/DAVIC); and

Multimedia Cable Network Services (MCNS) or Data-Over-Cable Service Interface Specification (DOCSIS).

The DVB/DAVIC Open Standard supports digital TV/Video, interactive services and telephony broadband networks. This provides the ability to display digital TV on a monitor. The European standard under DVB/DAVIC (ETISI—ETS 300 800 & DAVIC 1.5) has been accepted in South America and in much of Asia Pacific. Conversely, the MCNS/DOCSIS standard was initiated by the North American cable operators and media companies. This standard is obviously strong in North America but it is also used in parts of Asia Pacific.

Both these standards provide an MPEG2 stream and an IP stream, but there are significant differences in the types of encoding used to transfer data within the MPEG transport stream. As these differences mean that the two standards are not interchangeable, the core processing module 21 supports both of these standards.

There is a wide choice of processors but, having regard to the software architecture set out below, the chosen processor 24 should be capable of supporting Microsoft's Windows CE. Of course, the chosen processor 24 must also have processing performance deemed adequate for any given application. Several vendors provide such processors, for example as listed in the Microsoft web site at www.microsoft.com. The name Microsoft and the names of its products referred to herein are acknowledged as trade marks.

The memory resources of the core processing module are: system memory 25, typically 16 Mb of SDRAM; boot memory 26, typically 1 Mb of Flash EPROM used to store the system BIOS and also code for self-diagnostic functions; program download memory 27, typically 16 Mb of EEPROM; and video memory 28, typically 2 Mb of Video RAM.

An on-board VGA LCD display driver 29 provides video support. In this embodiment, the display driver 29 must be Windows CE compatible and must support TFY-type flat panels including LCD backlight control 30.

Touch screen control electronics 31 employ a Windows CE driver for operation of the touch screen overlay.

An audio controller 32 and signal amplifier 33 support input from a microphone 34 and mono output to a speaker 35, minimum of 1 W RMS. Cost-effectively, the microphone 34 and the speaker 35 are mounted directly onto the PCB of the core processing module 21 to eliminate interface cable and connector costs. Suitably configured, the communications module 12 thereby has the ability to operate as a hands-free telephone, optionally using Internet telephony or being connected directly to the subscriber's telephone service provider through the switched network.

A multi-I/O peripheral controller 36 controls the microwave oven 1, for which purpose an 8 bit data port (not shown) is made available on the CPU bus 37 for the oven manufacturer to interface with the conventional oven control devices. The controller 36 also controls an IR port (not shown). An IR interface (not shown) is provided for interfacing with external IR control devices such as an IR mouse, an IR keyboard or an IR remote controller such as used for TV. An appropriate IR interface device can be mounted directly onto the PCB of the core processor module 21.

Whilst the default communications medium is cable as aforesaid, an alternative to cable uses the capabilities of ADSL (Asymmetric Digital Subscriber Line), which is available over existing copper telephone lines. The core processing module 21 should therefore also have the ability to support ADSL connection where the video/TV content is appropriately formatted at the head end prior to transmission via an ADSL link. In case ADSL is used for the Internet connection and no video/TV content is provided via the ADSL link, then an RF input should also be provided for the video/TV signal. To this end, the cable modem 22 and MPEG decoder 23 shown in FIG. 6 can be supplemented by the circuitry shown in FIGS. 8(a) and 8(b).

Figure 7:
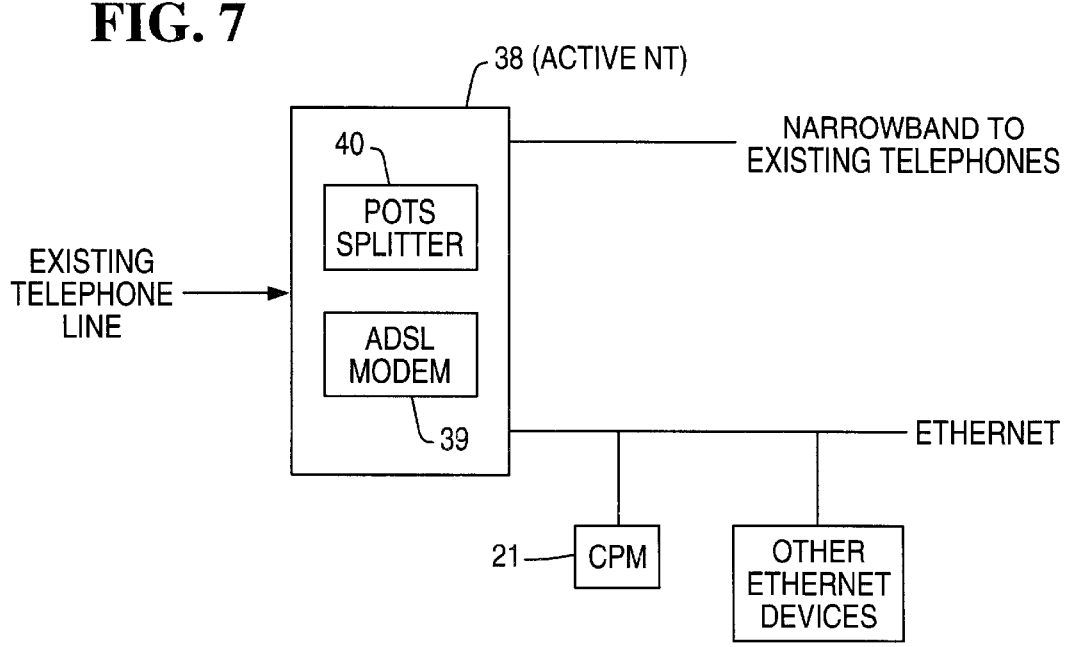
FIG. 7 is a block diagram of active network termination using ADSL.

First, however, reference is made to FIG. 7 to explain the options for network termination using ADSL. If ADSL connectivity is required, then the necessary network termination (NT) hardware should be provided external to the core processing module 21 as shown in FIG. 7. The connection between the NT 38 and the core processing module 21 should be an Ethernet connection.

Two types of network terminators are possible at the consumer premises, namely active NT and passive NT. In active NT as shown in FIG. 7, the ADSL modem 39 is part of the active NT point 38 and is provided by the telecommunications supplier. The output from the ADSL modem 39 can be in a number of formats including Ethernet. In passive NT, only the POTS splitter 40 is provided by the telecommunications supplier and so the consumer is expected to provide the appropriate ADSL modem 39 in each network end point. From the telecommunications supplier's viewpoint, active NT is preferred. However, for certain forms of xDSL such as VDSL where the upstream and downstream data rates are both equally very high (up to 26 Mbits/sec symmetrical), then a dedicated modem in each end point is desirable.

Figure 8A:
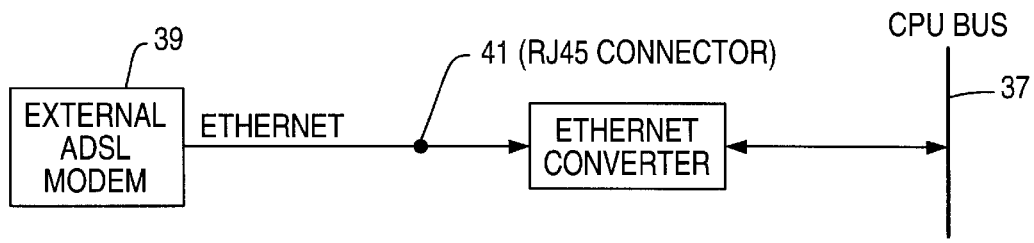
FIGS. 8(a) and 8(b) are block diagrams of optional communications circuits within the core processing module for handling ADSL and RF TV signals.
Figure 8B:
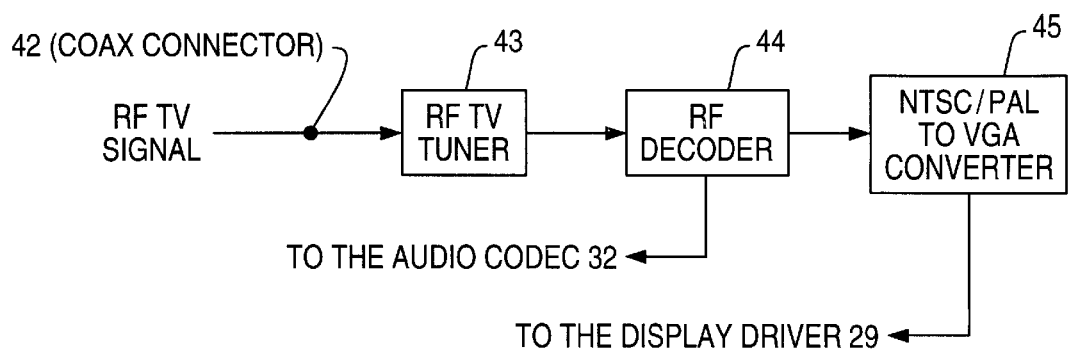

For the purposes of the present invention, however, the form of xDSL that is most suitable is ADSL, in which upstream rates of up to 1 Mbit/sec and downstream rates of up to 8 Mbits/sec are obtainable. In this instance, the core processing module 21 should provide an Ethernet connection for the purpose of connecting to the output of the external ADSL modem, 39 as shown in FIG. 8(a). An RJ45 connector 41 is illustrated for this purpose in FIG. 8(a), although an RJ11 connector can be used in the alternative.

Where RF TV connection is required, as shown in FIG. 8(b), a coaxial connector 42 feeds the RF TV signal to an appropriate RF TV tuner 43, which in turn feeds an RF decoder 44 that supplies audio information to the audio codec 32 and video information to an NTSC/PAL to VGA converter 45, which in turn supplies VGA-formatted video information for use by the display driver 29.

The net result of these connectivity issues is that the physical communications interface of the communication module 12 in FIG. 1. is a group of connectors C provided on the end of a flying lead cable FCL connected to the module 12. The group of connectors comprises an F-connector available for connection to a cable network, an RJ45 or RJ11 connector available for connection to an external ADSL modem, and a co-axial connector available to accept RF TV input. These connectors can of course be replicated on any appliance with which the communications module 12 is integrated. In any event, it is a design objective that an appliance including the communications module 12 shall require no special tools for installation and so should be installable by the customer, assuming that the site is properly prepared with communications cabling and power points.

The software architecture of the communications module 12 will now be described with reference to FIG. 9 of the drawings.

It is envisaged that the core processing module 21 will use as its operating system Microsoft's TVPAK software solution. Microsoft's TVPAK is a specialized version of its Windows CE operating system, developed for the demands of television set-top boxes. Windows CE is a reliable, flexible and compact operating system that provides functionality including multitasking, multithreading and specialized graphics handling for television pictures.

Full information on TVPAK, Windows CE and indeed all Microsoft products is available from Microsoft at www.microsoft.com.

Microsoft TVPAK provides, supports and is compliant with a broad range of television industry standards and hardware including:

DOCSIS and DVB, the two main emerging standards; and

DirectX support for high-performance graphics handling for television picture display and manipulation.

Figure 9:
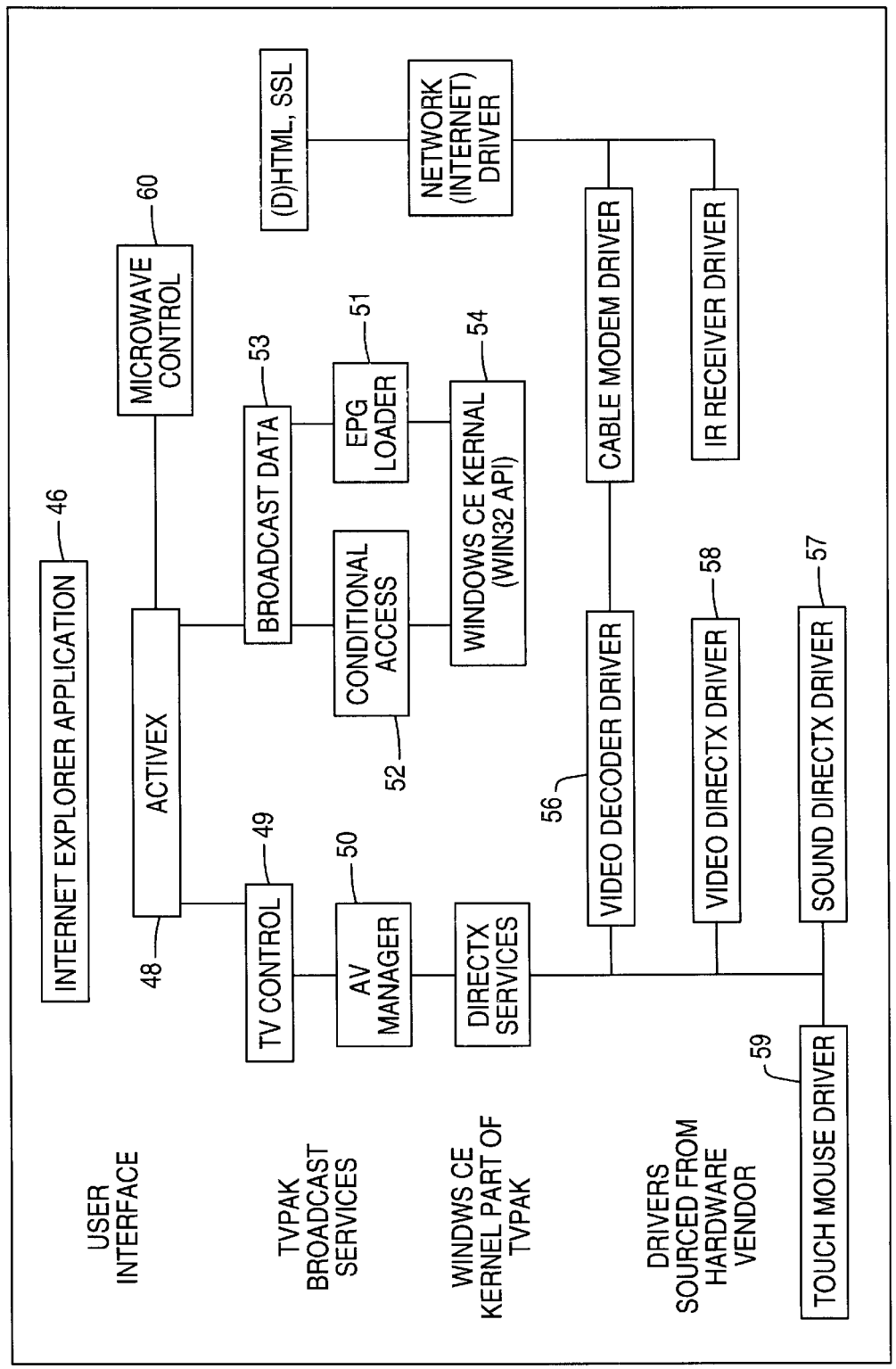
FIG. 9 is a block diagram of software module architecture of the core processing module.

With specific reference to the block diagram of FIG. 9, this illustrates the software modules within the currently preferred implementation of the invention. Briefly, Microsoft's TVPAK Windows CE implementation follows a set-top box architecture with hardware and software dedicated to the task of Internet and television service provision. Each box in FIG. 9 represents an available software interface definition defined by Microsoft, with the exception of the microwave oven control whose design will be within the compass of a skilled technician having regard to the operational requirements of the oven.

The Internet Explorer Browser 46 is the single controlling application that provides the primary user interface for both television and web content and potentially microwave oven control. HTML 47 is the Internet standard that allows the web content to be displayed. HTML 47 can reference ActiveX controls 48 that allow television pictures to be embedded within the page. HTML can also reference ActiveX controls 48 that control microwave oven operation.

Microsoft TVPAK also supports the Microsoft Broadcast Service (BCS) architecture. BCS architecture adds components to the Windows CE operating system that, in addition to basic TV control, provide management of audio/video streams; development electronic program guides (EPG); conditional access (CA) pay-per-view services; and processing of broadcast data (sub-band information, e.g. subtitles).

Microsoft TVPAK also includes the non-specialized Windows CE's Internet services. Windows CE includes access to the Internet using TCP/IP and comes equipped with a full set of access utilities, as follows.

Web browsing (Internet Explorer 4.01 based), HTML, DHTML.

Secure Socket Layer (SSL) access to Internet transaction services.

ActiveX support for the download of code and service enhancement.

Support for VBScript and JScript web scripting technologies.

However, Microsoft's Windows CE does not currently support Java™.

The Internet Explorer Browser 46 is provided by Microsoft as part of its TVPAK. The following sections detail customizations of the browser that are required to allow it to operate successfully within the communications module 12.

1. Software Start-up

When started, the software starts the Internet Explorer Browser 46 and loads an HTML home page located locally on the communications module 12. This allows the module to function even when not connected to a network.

Local page(s) could potentially be customized for the vendor or manufacturer of the appliance, or the service provider. If microwave oven control is accessed through the Internet Explorer interface, the web-page control pages would also be located locally on the communications module 12.

2. User Interface Security

The communications module 12 prevents the possibility of someone building a remote web page and attempting to control the microwave oven 1. Only local web pages will be able to access the ActiveX control that controls the microwave oven 1.

The communications module 12 includes security provisions that emulate the Microsoft wallet, which provides a secure mechanism for the storage and transmission of credit card information. For privacy reasons, personal information on user and credit information will be lost on loss of power.

When accessing a secure web page, the communications module will display a pad-lock indicating the use of secure sockets.

3. Text Entry

When a user selects a control on a web page that requires text entry, the communications module 12 will automatically present a software keyboard on the display 20. The keyboard will overlay the Internet browser display presenting a full "qwerty" keyboard with digits, delete and enter keys.

The keyboard will also attempt to auto-complete an entry when a previous entry matches what the user types. Again for privacy reasons, auto-complete information will be lost on power loss.

4. Redirection List

The communications module 12 will maintain a list of redirection URLs. If a user is linked to or types in a URL that exists in the redirection list, the user will be redirected to a corresponding match in the list. This list is to ensure that users of the communications module are provided with the highest quality of service when specialized versions of the service exist. For example, instead of linking to the default Amazon ™ web site http://www.amazon.com, users could be taken to a 'microwave' version http://microwave.amazon.com. Users can thereby be directed to value-added services where applicable, allowing for e.g. revenue generation. An up-to-date redirection list can be downloaded to the module 12 on each power-up and initial connection to the content service provider.

5. Broadcast Services

Underlying the user-interface TV control are broadcast services (BCS). As mentioned briefly above, BCS is a set of technologies, primarily provided by Microsoft, that extracts specialized television content.

TV control 49: A high level ActiveX control that can be embedded into a web page. The control displays a full motion television channel. The control is supplied by Microsoft.

ANV manager 50: Used by the TV Control 49, the ANV Manager 50 uses the high performance DirectX graphics engine within Windows CE to draw the television picture onto the video display. The ANV Manager is supplied by Microsoft.

Conditional access manager 51: The conditional access manager 51 is a set of ActiveX controls used by web pages and web script to access parental control and other services including encrypted or pay services. Conditional Access ActiveX controls are provided by Microsoft. Underlying the controls is a 'CA service provider' which must be developed to match the content provider entitlement system.

Electronic program guide (EPG) 52: The EPG ActiveX control operates continuously in the background collecting programming information. The EPG relies upon the web browser to present a user interface and only provides access to the programming database. An ActiveX control to access EPG information is provided by Microsoft. Underlying the controls, an 'EPG loader' must be developed to match the in-band, out-of-band broadcast mechanism of the content provider.

The conditional access manager 51 and the electronic program guide 52 operate upon broadcast data 53.

Providing the mainstay functionality within the Windows CE operating system is the Windows CE kernel 54. The kernel 54 provides the familiar Win32API used extensively by the Internet Explorer Browser and Broadcast Services.

The Windows CE kernel 54 uses an OEM adaptation layer (OAL) to access machine specific hardware. Building the communications module around standard industry processors, memory and buses allows the use of Microsoft supplied OALs, where possible.

Windows CE services allow network applications, including the Internet Explorer Browser, to access the physical hardware connected to the network.

Connection to a cable network will require a cable modem interface; the Windows CE networking subsystem will communicate to the modem interface using an NDIS interface driver.

Windows CE provides a driver 55 to connect the IR receiver to the Windows CE network subsystem. The IR receiver will allow ActiveX objects on the user interface to receive remote-control events. In general, Windows CE uses drivers to allow hardware to be controlled from Windows CE applications. As shown in FIG. 9, a number of drivers will be required to access device-specific hardware.

Underlying the Microsoft A/V Manager is a hardware video decoder. The video decode hardware 56 takes a data stream from the cable modem 39 and translates it into a video display. This translation can be computationally expensive and benefits from hardware acceleration. To avoid the need to develop a unique driver, the video decode driver 56 chipset is preferably selected on the basis of having a Windows CE driver.

The sound 57 and video 58 hardware requires DirectX drivers to provide a rich audio and video presentation. Again, the sound/video chipset selection should be based upon having a Windows CE driver to avoid the need for a unique driver.

The touch mouse driver 59 translates touch events on the touch screen into mouse events. Such a driver 59 will generally be available from the touch screen hardware vendor.

The microwave driver 60 is a specialist driver to control the oven operation, developed to match the operational requirements of the oven 1.

The Internet communications capability of the communications module 12 supports the capability to update the system software by remote download. Download is preferably transparent to the user and happens in the background of other tasks. When download is complete, the communications module 12 suitably waits for a period of inactivity before momentarily interrupting service to start the new software, without any user intervention.

Software can be downloaded in this way using the Internet FTP protocol. An FTP downloader is embedded as part of the Microsoft Internet Explorer and WEB servers.

The latest downloaded software will be persistently stored in EEPROM 26 in case of a restart. The communications module will require twice the image size EEPROM (16 Mb) to allow it to store the complete valid running image and a potentially near complete download image. The communications module will in any event have one complete valid application image continually stored in EEPROM 26 in case of power failure.

Figure 10A:
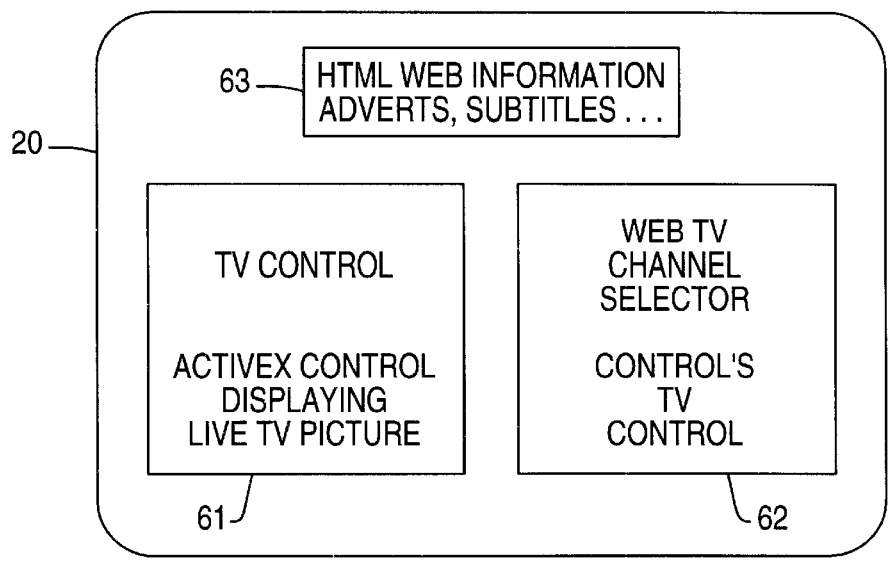
FIGS. 10(a) and 10(b) illustrates two example web pages that can be displayed by the communications module to provide access to Internet and television content.
Figure 10B:
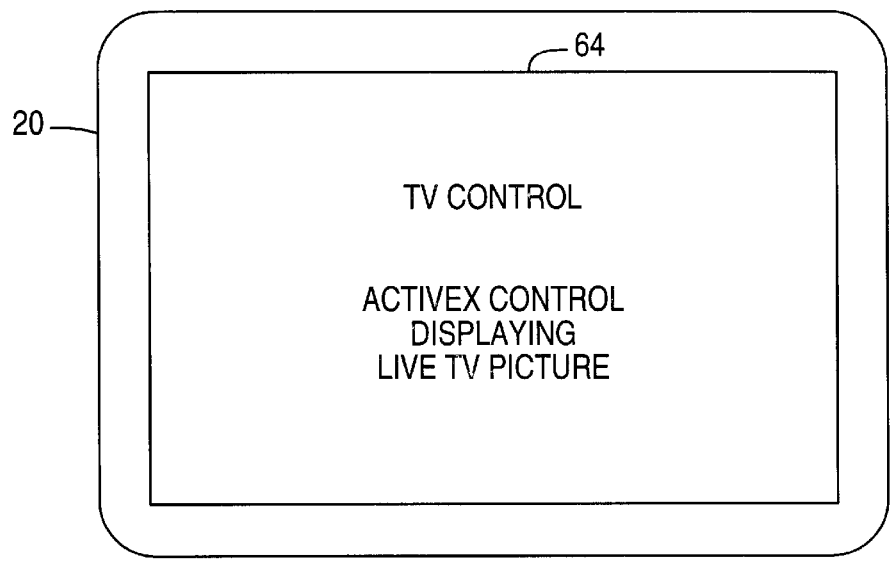

FIGS. 10(a) and 10(b) illustrate two example web pages that provide access to Internet and television content. FIG. 10(a) illustrates Internet and TV content in which TV content is shown as an ActiveX-generated frame 61 beside TV controls 62 and general web information 63 such as sponsored adverts relevant to the TV transmission, or banner advertising to which the user can respond by 'clicking through'. FIG. 10(b) illustrates TV-only content in which the ActiveX control displays a TV picture 64 occupying substantially all of the display 20. Access to microwave-specific services can be obtained by the same techniques.

In the interests of low running costs and environmental friendliness, consideration should be given to conserving power whenever possible. For this reason, provision is made for a 'standby power' state where the graphics system shuts down and the display goes off. Entry into this reduced power state may be user-activated in any suitable manner, for example via an on-screen control, or when a predetermined period of inactivity has elapsed.

Figure 11:
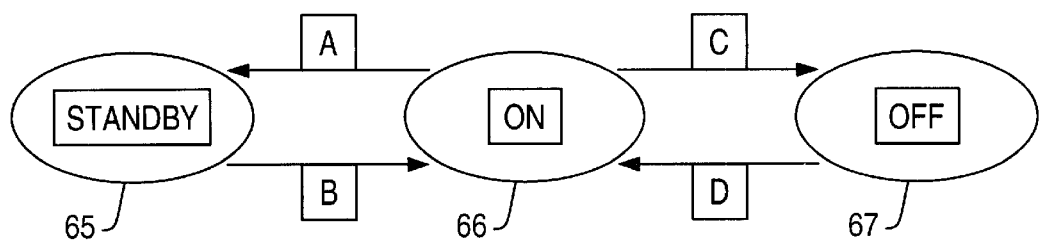
FIG. 11 is a flow diagram illustrating switching between 'standby', 'on' and 'off' modes, for example for the purposes of power management.

The power management scheme is illustrated in FIG. 11, which shows how the communications module can switch between the three possible states of 'standby' 65, 'on' 66 and 'off' 67. In operation 'A', the user activates a standby mode 65, for example by pressing an appropriate key on the touch screen overlaying the display 20, to switch the communications module 12 from 'on' 66 to 'standby' 65. It would also be possible for a time-out means to switch the communications module 12 automatically from 'on' 66 to 'standby' 65 when a predetermined time has elapsed without the presence of a user having been detected, or without the touch screen being touched. In operation 'B', the communications module 12 reverts from 'standby' 65 to 'on' by detecting the nearby presence of a user or by receiving a touch input from the user as aforesaid. In operations 'C' and 'D', the user also has the option of toggling the communications module between 'on' 66 and 'off' 67 states.

Exit from the standby state 65 may be effected by sensing the proximity of a user and/or a user's touch upon the touch screen. To allow the former possibility, a proximity sensor (not shown) is included to detect the presence of a user within close proximity to the communications module 12. The proximity sensor provides a means for switching the communications module 12 from its standby mode 65 to its full power-on state 66. By the same token, the sensor in conjunction with a time-out means provides a way to switch the communications module 12 from 'on' 66 to 'standby' 65 when a predetermined period of inactivity is observed by the sensor.

An appropriate proximity sensor would be a standard PIR (passive infra red) sensor. The sensor should have a near range capability to ensure that the system only switches to full power-on mode 66 when a user comes close to the communications module 12. It has been mentioned above that an 8-bit data port may be made available to a microwave oven manufacturer to interface with the conventional oven control devices. This port may also serve as an interface for the proximity sensor.

Coupled with the aforementioned IR remote control, the proximity sensor helps the disabled. For similar reasons, the communications module 12 can be programmed to support voice recognition so that speaking to the module 12 can control its operation and that of any appliance that the module 12 in turn controls. The aforementioned microphone 34 can be used for that purpose.

It is also possible for a display to be maintained when in the standby mode 65, in the manner of a screensaver. Whilst this may not save much power, such a standby display would be an excellent opportunity for advertising at the heart of the home. If downloaded periodically from the communications network to which the communications module 12 is connected, such advertising can be targeted in various ways. For example, it can reflect that household's demographic standing or its recent buying or browsing patterns, or it can simply be adapted to suit the weather or the time of day.

The advertising concept extends to local information services, such as what's happening today at the town hall, what's on tonight at the local cinema, and so on. It is also possible to define affinity groups within a community to whom special services are offered relating to their shared interest such as fishing, motoring, do-it-yourself and other hobbies.

The invention also lends itself to participative games, playing a lottery or other gambling games. For example, in view of the architecture of cable networks, it is possible to play one's neighbor at, for example, chess while each player is still in his or her own home. There would be ample bandwidth in a cable network for the players also to speak to and hear each other during their game, using the microphone 34 and speaker 35 of the communications module 12 in the manner of a hands-free telephone as aforesaid.

In general, the invention can be a major enabling factor in home automation, the communications module 12 becoming a home server for basic information functions to wireless phones, personal digital assistants (PDAs) etc. The communications module 12 can also be linked to security systems, for example being linked to a CCTV camera to display who is at the front door when the doorbell rings. Yet, the essential simplicity of the communications module 12 is such that it can be used as a family organizer, note pad or notice board at the hub of the domestic environment.

The addition of a barcode reader to the communications module 12 or to the appliance itself gives further application options. It is envisaged that the reader could be used to re-order articles that are already within the appliance owner's home, such as groceries, clothes, videos or any other item that has a barcode printed upon it.

A smartcard reader can be added to the communications module 12 or to the appliance with which that module 12 is associated, thus opening up further application options. As well as enabling numerous other functions such as the hotel communications device described above, smartcard functionality would allow true private banking. For example, a user can load electronic cash (e-cash) onto his or her e-cash card or can spend such e-cash upon purchases located when browsing the Web using the communications module 12. Also, by identifying the user, a smartcard can be used for security purposes, or to configure, limit or otherwise define the service offered to the user. For example, the service offered can reflect a user's preferences stored on the smartcard or can be limited in accordance with the user's age or level of subscription payment.

The smartcard reader must be positioned in an easily accessible place, and should retain the card during transactions to prevent removal of the card before the transaction is complete. The smartcard reader could of course retain the card after the transaction is complete, until the user is ready to pick up the card again.

In microwave oven applications, the microphone, barcode reader or smartcard reader can be positioned, conveniently, on the fixed control and display surface 4 on the front of the microwave cabinet 2 beside the door 3.

Another hardware option is to give the communications module 12 a printer driver facility to drive an external printer. This would be useful for generating coupons relating to marketing offers advertised on the LCD display 20, and of course to keep hard copies of any advertising or other material thus displayed. In conjunction with an Internet newspaper service, the communications module 12 could be programmed to download and print a newspaper ready for its owner getting up each morning.

Indeed, when everybody has a communications module 12 or like facility, there would be no need for a postal service because everyone could print out e-mail. This suggests advantages in adding a scanner to allow people to write letters and then scan them in to the communications module for onward transmission. Peripherals such as a printer and/or scanner should be external to the communications module 12 to preserve its compactness and, for convenience, can communicate with the module 12 through wireless means such as radio or IR.

With the widespread adoption of digital cameras, it would be useful to 'plug in' a digital camera's memory stick (this is a Sony standard for saving digital pictures) into the communications module 12 or the appliance with which the module 12 is associated. This allows the user to view digital pictures on a larger display than the camera allows and since the communications module 12 is connected to the Internet, an appropriate ISP could offer free web storage space to which the pictures could be uploaded for retrieval and optionally printing whenever required.

Whilst connection to the Internet is much preferred for the wealth of facilities it allows, the communications module need not necessarily be connected to the Internet: it may, for example, be connected only to a domestic broadband system supplying just TV/radio content. The communications module could be configured to receive IPPV (impulse pay per view) transmissions for pay-TV purposes.

Figure 12:
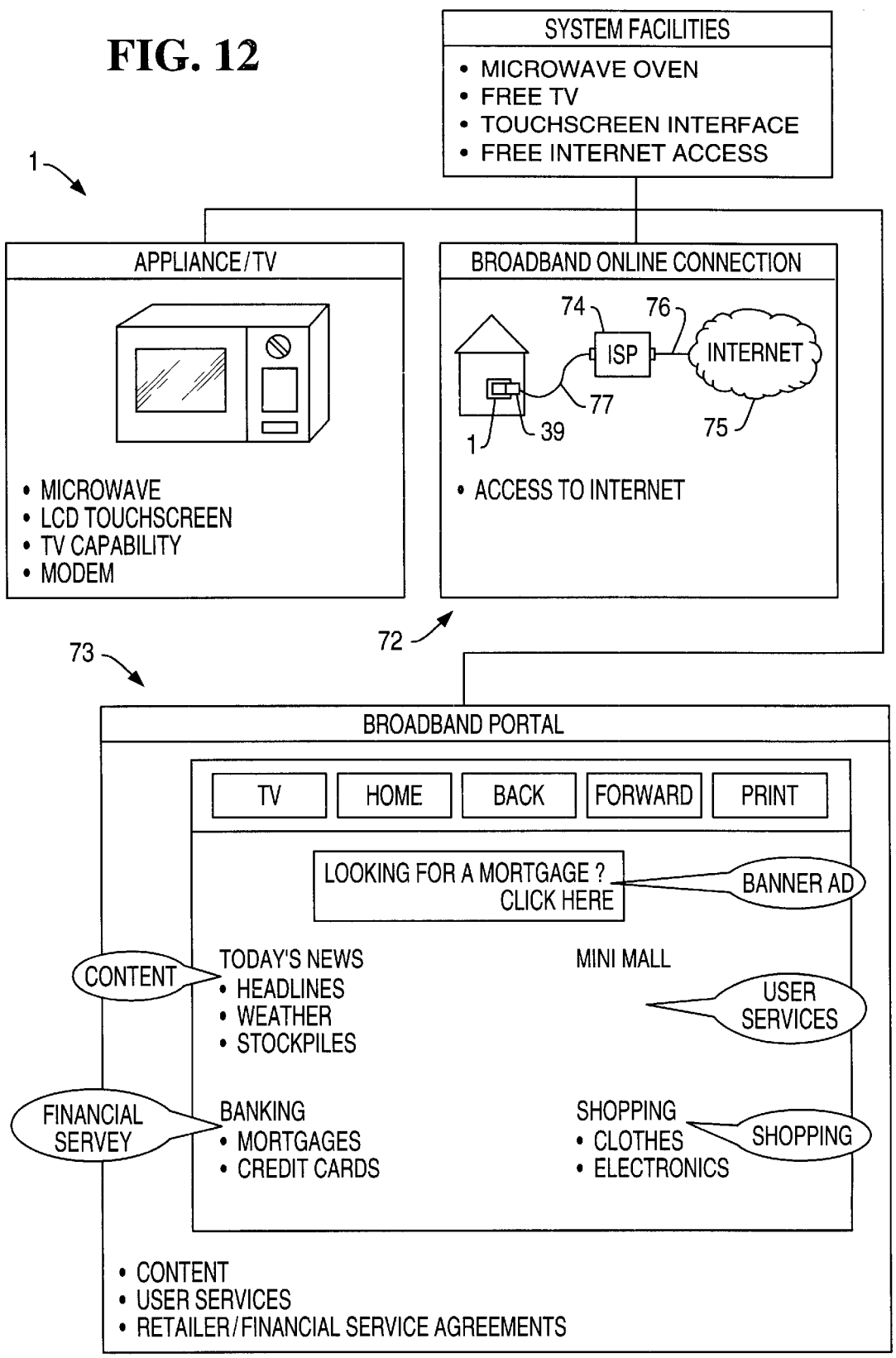
FIG. 12 is a block diagram illustrating three elements of a communications system according to the invention, the microwave oven of FIG. 1 being the first of those elements.

The appliance 1 itself is just one of three elements of a communications system that embodies the invention in its various forms. These three elements of the communications system are represented in FIG. 12 of the drawings. It will be seen that the other elements are a broadband online connection 72 that allows 'always-on', high speed access to the Internet, and a broadband portal 73 that offers functionality and services to ensure the continuing loyalty of intermediate customers in an open access environment.

The appliance 1 has been described technically in detail above. As a business proposition, much of its success must naturally flow from the superior technical facilities and interface that it offers its users. However, the modular construction reduces the need for product development investment by the appliance manufacturer and so lessens the need to grant exclusivity to any one appliance manufacturer. The grant of such exclusivity might otherwise be necessary to recoup development costs, to the possible detriment of market penetration and hence propagation of the technology.

The technical features of the broadband online connection 72 are also well known, the main alternatives of cable and xDSL having been outlined above. Basically, cable is preferred to xDSL for its ease of installation and better TV capabilities but, for the purposes of the invention, either is much better than a standard dial-up telephone connection. A standard dial-up connection is not capable of supporting the ideal always-on, always-available characteristics of the appliance 1, or the real-time, high quality access to content that users will demand. Alternatives such as full ISDN, satellite telephony and T1 are variously expensive to install and to run, are unsuitable in the domestic context, and do not match the performance of xDSL or, particularly, cable. In any event, competition between cable and xDSL is increasing and this will drive broadband availability upwards.

As shown in the broadband online connection 72 in FIG. 12, access to the Internet 75 is achieved through an Internet service provider (ISP) 74 that is connected to the Internet 75 via a backbone 76. The ISP 74 connects to the appliance 1 in turn via a local loop 77 and modem 39. Of course, in practice, the network architecture that connects the appliance 1 to the Internet 75 via the ISP 74 is very much more complex, involving multiple cascading levels of leased bandwidth terminating in network access points that connect to the Internet itself. However, as such details are well known, will vary depending upon the ISP and are not germane to the present invention, they need not be elaborated upon here.

Commercially, it is envisaged that Internet access through the appliance 1 should be outsourced completely. The physical and commercial structure of typical xDSL networks allows for multiple supplier contracts. Cable networks, on the other hand, tend to be owned by the cable providers who have exclusivity for particular geographical areas. So, it is envisaged that equity partnerships should be sought with cable providers selected to maximize user access and hence potential penetration.

The broadband portal 73 provides access to content such as today's news, and user services such as e-mail. The portal 73 also embodies agreements with e.g. retailers and financial service providers, to whose web pages it provides hypertext links. Again, portal developments and/or agreements with retailers and so on can be outsourced, possibly with the incentive of equity partnerships to share risk and reward.

The portal 73 suitably carries banner advertising and section sponsorship. Banner advertising may be paid for on a 'click-through' basis proportional to the number of users who respond to the advertisement by 'clicking through' the banner advertisement. This direct customer feedback assists in targeting the advertisements and in pricing performance-based advertising. Advertisements can be targeted according to user action within the site (for example, a user may be more likely to click on a banner while shopping than while reading news) and/or according to previous shopping behavior. This ensures the relevance of the advertisement and so improves the prospect of a click-through and hence of generating advertising revenue that depends upon the click-through.

Section sponsorship can be structured in various ways, and has the benefit of a more predictable income stream than banner advertising. For example, while users watch TV, a frame of advertisements around the TV display area could be sold on a sponsorship basis. Additionally, as suggested above, commercials can fill the display like a screen saver when the user is not watching TV or interacting with the portal 73.

Figure 13:
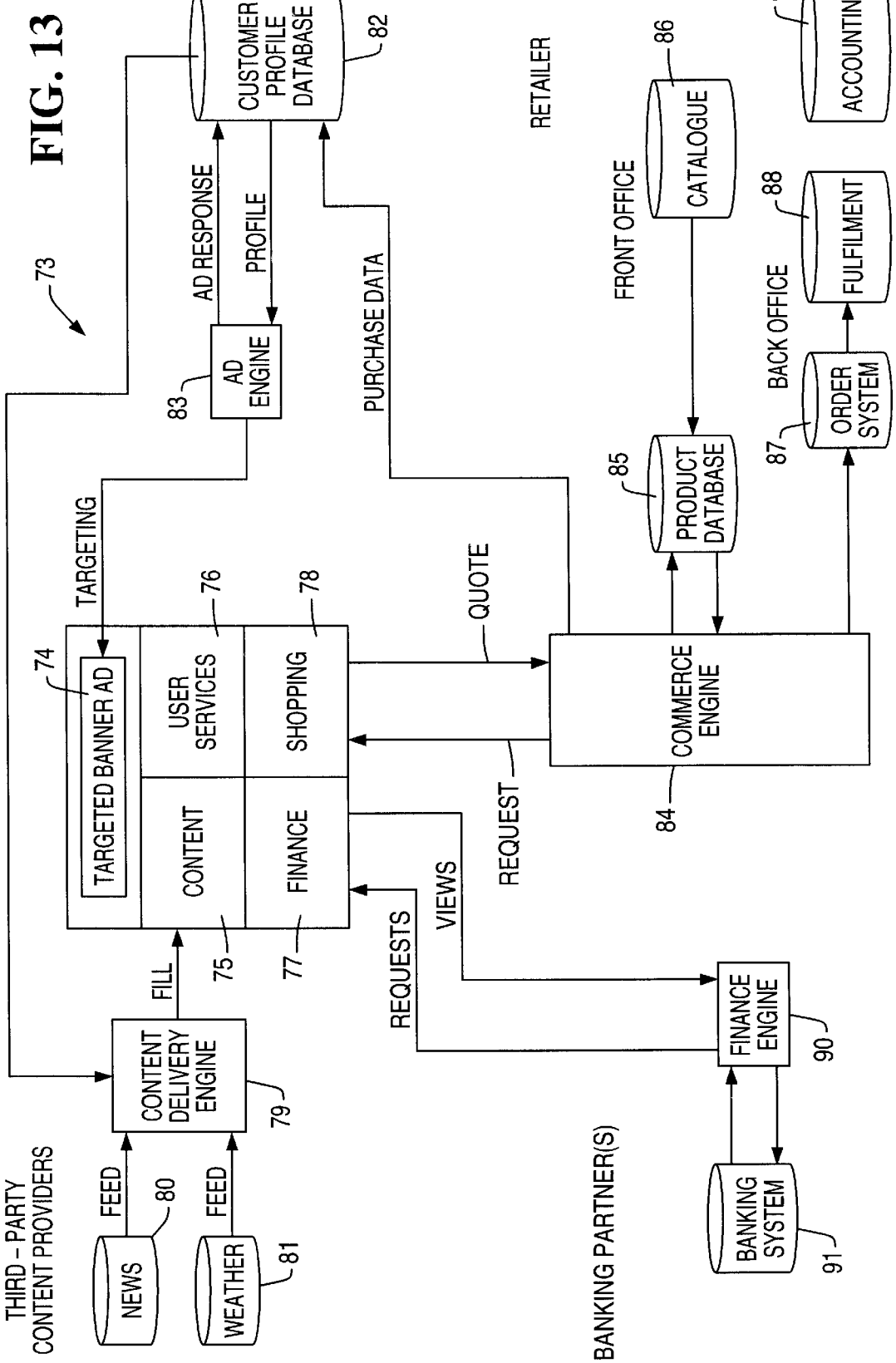
FIG. 13 is a block diagram of a portal being the third of the elements shown in FIG. 12.

FIG. 13 is a conceptual block diagram showing the functionality of the portal 73. For this purpose, the portal can be broken down into five main sections: a targeted banner advertisement 74; content 75; user services 76; finance 77; and shopping 78. These latter two sections may be thought of as coming together under the heading 'transactions' and so may share many enabling functions.

A content delivery engine 79 takes feeds from third-party content providers such as a news agency 80 and a weather forecasting office 81 and, having regard to input from an adaptive customer profile database 82, makes available to the content section 75 of the portal 73 whatever content is deemed appropriate to that customer or user. Of course, in practice, very much more information than news and weather will be of potential interest to the user, examples being listings of TV and local entertainment; charts of stocks and shares; feature articles; reference works such as directories and maps; entertainment such as games or music/video streaming; and interaction/communication content such as discussion groups, notice boards or real-time chat.

The customer profile database 82 is also used by an advertising engine 83, which targets the banner advertising 74 with reference to the customer profile and also feeds back information on the customer's response to that advertising, so as to update and if necessary adapt the customer profile database 82.

Similar feedback is provided to the customer profile database 82 from a commerce engine 84, but this time based upon the customer's actual buying behavior. The commerce engine 84 deals with requests and quotes to and from the customer via the shopping section 78 of the portal 73, interacting with a product database 85 fed in turn by a catalogue database 86 held by a retailer in its 'front office'. Interaction also takes place between the commerce engine 84 and the retailer's 'back office' for ordering 87, fulfillment 88 and accounting 89 procedures. Of course, the user can buy in various ways, for example through partner retailers, via auctions or in response to classified advertisements.

A finance engine 90 interacts with the finance section 77 of the portal 73 to enable the user to view details such as checking the status of his or her bank account, to perform transactions such as paying bills, and to investigate, apply for or purchase new financial products like pensions or mortgages. The finance engine 90 is connected to the banking system 91 for this purpose. Although not shown, it would equally be possible to provide for feedback from the finance engine 90 to the customer profile database 82, or for the commerce engine 84 to handle purchases of financial products instead of the finance engine 90.

When a user wishes to use the electronic banking facility of the finance section 77, the appropriate icon is selected on a touch screen toolbar on the display 20 that defines the user interface. A message requesting the user to enter authentication data is displayed and subsequently, a series of options relating to the various facilities available to the user is displayed on the display 20. The user then selects the required option and is requested to enter details relating to the transaction. When all the information necessary to conduct the transaction has been provided by the user, the authentication transaction details are transmitted over the Internet to an appropriate remote management unit within the banking system 91 where verification of the authentication data takes place and on validation, the transaction details are processed. The electronic banking facility can be used for payment transaction, ordering of cheques, travellers cheques, bank drafts etc., and for statement or balance requests.

Finally, the user services section 76 provides for personal services and for site-internal functions like a help facility and an internal search engine. Myriad personal services can run within the user services section 76 of the portal 73. Examples are user profiles for personalized news; a shopping account for e.g. shopping and credit card details; a loyalty scheme or club membership; personal organizer functions like calendaring or scheduling; e-mail; a real-time messaging service; and personal home pages.

When a user wishes to use the e-mail facility, the appropriate icon on the touch screen tool bar is selected and the core processing unit 21 causes the appropriate information to be displayed on the display 20. The user can open received mail or compose mail messages by entering data via the keypad on the touch screen or, with speech recognition software, via the microphone 34 in the communications module 12. The message can then be transmitted to the desired recipient over the Internet.

The personal organizer facility allows the user to maintain a diary and request reminders for specific events such as birthdays, appointments and so on, and can maintain personal data in various spreadsheet programs.

The functionality of the portal 73 can be developed from scratch or in partnership with a major existing portal such as Excite ™, which brings the benefit of existing relationships with retailers and financial services companies.

Reverting now to the comparison between open and closed Internet access, aspects of the invention such as the aforementioned redirection list could be used to facilitate closed access which enables access to only selected sites specially adapted to users of the appliance. For example, links in such sites would need to be adapted so that they lead only to similarly-adapted sites but this could be achieved by the redirection list so that redirection takes place locally rather than requiring wholesale adaptation of the sites themselves.

Nevertheless, open access is preferred, albeit influenced by enticements to customers to stay with the appropriate service provider and discouragements for them to leave. Enticements to stay are good functional and aesthetic design, convenience, automatic personalization, an attractive and simple interface for TV functionality and an excellent family-oriented portal carrying much of relevance and interest. On the other hand, customers may be discouraged to leave by, for example, the browser opening into a default home page that cannot be changed by the user. It is further preferred that TV viewing can only be requested from that home page. Another possibility is that the functionality of the microwave oven, or other appliance with which the communications module is associated, can only be selected via that home page. Once selected, actual control of the TV or appliance can then be delegated to other control means such as the IR remote control or a keypad image on the LCD display 20 operable by the touch screen overlay.

Of course, the redirection list itself also preserves revenue streams while allowing open access, by directing users to specific versions of user-selected web sites where such alternatives exist.

Many variations are possible within the inventive concept. For example, most domestic appliances receive operating power by means of a mains supply unit which could also provide a communications channel for access to the Internet, so as to provide for communication of data to and from the domestic environment.

It should also be appreciated that other forms of data input means could readily be incorporated into an appliance embodying the present invention such as, for example, a smart tag reader means for reading data from a smart tag associated with a food product being cooked, defrosted or stored in the appliance.

The present invention offers particular advantages in that the domestic appliance concerned is generally incorporated into a specific domestic environment, i.e., the kitchen, and in that the functionality of the domestic appliance is extended. Also, the invention provides apparatus that is much more user friendly than current apparatus allowing for Internet access and it can readily provide a user interface that allows for ease of reading and therefore interaction within the environment in which the appliance is commonly used.

What is claimed is:

1. A domestic appliance (1) comprising: mounting hardware (6), a discrete communications module (12) connectable to a communications network (75), and an adaptor (7) including means for attachment to the mounting hardware (6) on the appliance (1) and means (10, 13–16) for mounting the communications module (12) (12) to the appliance (1) via the adaptor (7).

2. The appliance (1) of claim 1, wherein the communications module (12) is received in a recess (10) in the adaptor (7).

3. The appliance (1) of claim 2, wherein the adaptor (7) frames the mounted communications module (12) received in the recess (10).

4. The appliance (1) of claim 1, wherein the appliance (1) has a door (3) and wherein the mounting hardware, the adaptor (7) and the communications module (12) are part of the door (3) of the appliance (1).

5. The appliance (1) of claim 4, and being a microwave oven (1).

6. System according to claim 1, wherein the communications module comprises a means to connect to the Internet.

7. System according to claim 1, wherein the communications module comprises a personal computer.

8. A domestic appliance comprising:
   a) mounting hardware (6);
   b) a discrete communications module (12) connectable to a communications network (75); and
   c) an adaptor (7) including
      i) means for attachment to the mounting hardware (6) on the appliance (1);
      ii) means (10, 13–16) for mounting the communications module (12) to the appliance via the adaptor (7); and
      iii) a recess (10) wherein the communications module (12) is received; and
   d) bias means (11) for urging the communications module (12) out of the recess (10).

9. The appliance (1) of claim 8, wherein latch means (18) acting against the bias means (11) hold the communications module (12) releasably in the recess (10).

10. A domestic appliance comprising:
    a) mounting hardware (6);
    b) a discrete communications module (12) connectable to a communications network (75); and
    c) an adaptor (7) including
       i) means for attachment to the mounting hardware (6) on the appliance (1);
       ii) means (10, 13–16) for mounting the communications module (12) to the appliance via the adaptor (7), such that the communications module (12), when mounted, is movable with respect to the adaptor (7).

11. The appliance (1) of claim 10, wherein the adaptor (7) and the communications module (12) are connected by mounting hardware (13–16) that permits the communications module (12) to adopt any of a plurality of discrete positions with respect to the adaptor (7).

12. A domestic appliance comprising:
    a) mounting hardware (6);
    b) a discrete communications module (12) connectable to a communications network (75) via a flying lead connectable to an external terminal on the appliance; and
    c) an adaptor (7) including
       i) means for attachment to the mounting hardware (6) on the appliance (1);
       ii) means (10, 13–16) for mounting the communications module (12) to the appliance via the adaptor (7).

13. The appliance (1) of claim 12, wherein the flying lead includes a port for data communication between the communications module (12) and the appliance (1).

14. A system, comprising:
    a) a microwave oven having an opaque metallic door (5);
    b) lugs (6) attached to the exterior of the door (5);
    c) a frame (7) having
       i) holes (6A) on a rear face which snap-fit to the lugs (6); and
       ii) a recess (10) on a front face;
    d) a communications module (12) within the recess (10); and
    e) hinge means which
       i) connect the communications module (12) with the frame (7) and
       ii) allow the communications module (12) to pivot about a horizontal axis.

15. System according to claim 14, and further comprising f) a latch (18) for restraining the communications module (12) from pivoting.

16. System according to claim 14, wherein the communications module (12) comprises a personal computer.

17. A method of assembling a domestic appliance (1) and a standard communications module (12), the method comprising providing one of a plurality of different domestic appliances (1) having mounting hardware (6), fitting to the mounting hardware (6) of the appliance (1) an appropriate one of a plurality of different adaptors (7) each having a standard mounting (10) for a communications module (12) and means cooperable with the mounting hardware, and mounting to that adaptor (7) a standard communications module (12).

* * * * *

UNITED STATES PATENT AND TRADEMARK OFFICE
CERTIFICATE OF CORRECTION

PATENT NO. : 6,359,270 B1
DATED : March 19, 2002
INVENTOR(S) : Bridson, A.

It is certified that error appears in the above-identified patent and that said Letters Patent is hereby corrected as shown below:

Column 23,
Line 25, after "(12)", first occurrence, delete "(12)".

Signed and Sealed this

First Day of October, 2002

Attest:

Attesting Officer

JAMES E. ROGAN
Director of the United States Patent and Trademark Office